United States Patent [19]

Citta et al.

[11] Patent Number: 5,600,677
[45] Date of Patent: Feb. 4, 1997

[54] TRELLIS CODED MODULATION SYSTEM FOR DIGITAL TELEVISION SIGNAL

[75] Inventors: Richard W. Citta, Oak Park; David A. Willming, Palatine, both of Ill.

[73] Assignee: Zenith Electronics Corporation, Glenview, Ill.

[21] Appl. No.: 586,441

[22] Filed: Jan. 16, 1996

Related U.S. Application Data

[62] Division of Ser. No. 272,181, Jul. 8, 1994.

[51] Int. Cl.$^6$ .............................. H04L 27/04; H04L 27/20
[52] U.S. Cl. .......................... 375/296; 375/298; 375/308
[58] Field of Search ................................ 375/296, 298, 375/308, 295, 285, 264, 263, 262, 265, 290; 348/470, 608, 607; 332/103

[56] References Cited

U.S. PATENT DOCUMENTS

| | | | |
|---|---|---|---|
| 4,945,549 | 7/1990 | Simon et al. | 375/280 |
| 5,087,975 | 2/1992 | Citta et al. | 375/290 |
| 5,095,497 | 3/1992 | Aman et al. | 375/254 |
| 5,162,812 | 11/1992 | Aman et al. | 375/254 |
| 5,249,200 | 9/1993 | Chen et al. | 375/285 |
| 5,263,051 | 11/1993 | Eyuboglu | 375/285 |
| 5,311,547 | 5/1994 | Wei | 375/18 |
| 5,363,408 | 11/1994 | Paik et al. | 375/261 |
| 5,388,124 | 2/1995 | Laroia et al. | 375/265 |
| 5,394,439 | 2/1995 | Hemmati | 375/242 |
| 5,442,626 | 8/1995 | Wei | 375/261 |
| 5,452,009 | 9/1995 | Citta | 348/470 |
| 5,452,015 | 9/1995 | Hulyalkar | 348/608 |
| 5,457,705 | 10/1995 | Todoroki | 371/43 |
| 5,508,752 | 4/1996 | Kim et al. | 348/608 |

OTHER PUBLICATIONS

Lee–Fang Wei, "Precoding Technique For Partial–Response Channels with Application to HDTV Transmission," IEEE Journal on selected area of communication Vol. 11, No. 1, pp. 127–135, XP 00378004 Jan. 1993

Ezio Biglieri et al., "Introduction to Trellis–Coded Modulation with Application," Macmillan Publishing Co., pp. 487–490 1991.

IEEE Transactions on Communications, Jul., 1989, USA, vol. 37., No. 7, ISSN 0090–6778, pp. 669–676, Chevillat P. R. et al.: "Decoding of Trellis–Encoded Signals in the Presence of Intersymbol Interference and Noise".

IEEE Transactions on Communications Feb., 1988, USA, vol. 36, No. 2, ISSN 0090–6778, pp. 222–224, Zehavi E. et al.: "On Saving Decoder States for some Trell Codes and Partial Response Channels".

*Primary Examiner*—Tesfaldet Bocure

[57] ABSTRACT

A trellis coded modulation system comprises a first coder for convolutionally coding a first input data bit $X_1$ for deriving first and second output bits $Z_0$ and $Z_1$. A second coder precodes a second input data bit $X_2$ for deriving an output bit $Z_2$. The output bits $Z_0$, $Z_1$ and $Z_2$ are mapped into corresponding one-dimensional multi-value symbols, wherein the output bits $Z_0$, $Z_1$ identify respective subsets of the symbols, each of the subsets comprising two equally spaced symbol values, and the output bits $Z_1$, $Z_2$ identify respective pairs of the symbols, each of the pairs comprising two adjacent symbol values.

26 Claims, 16 Drawing Sheets

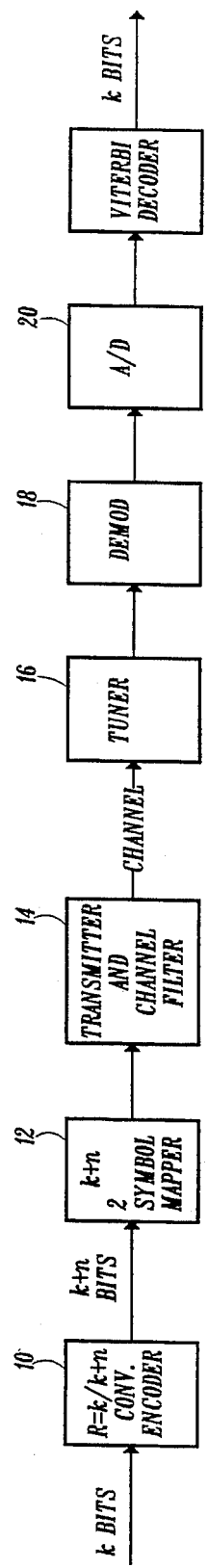
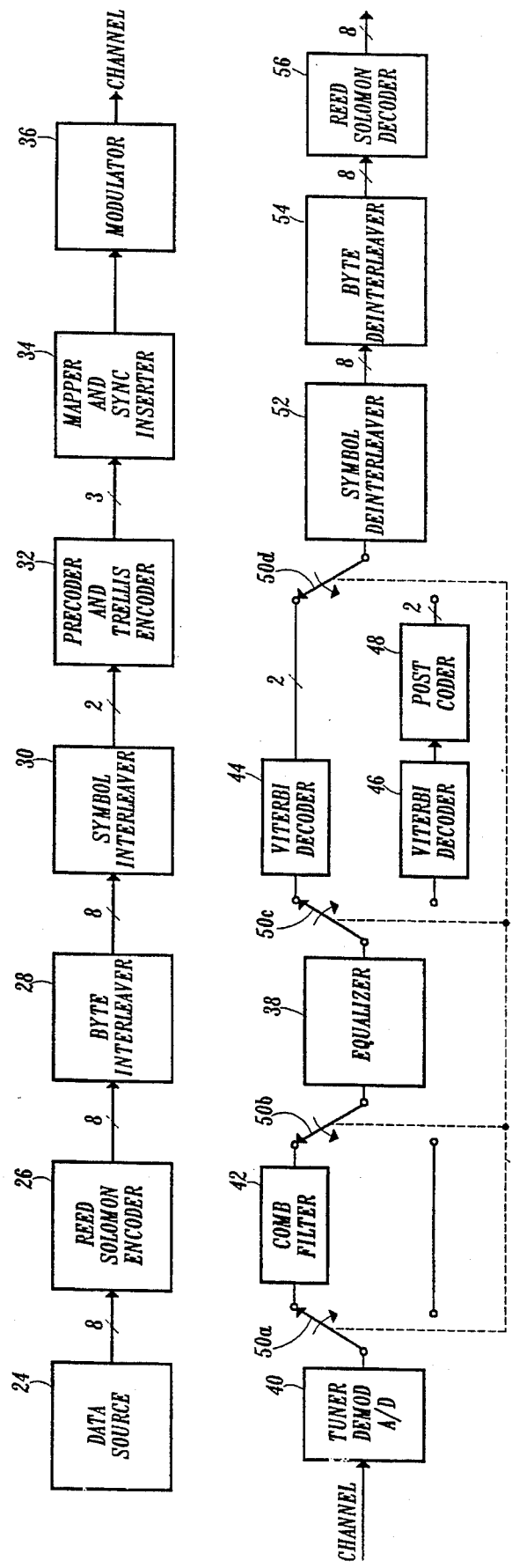
FIG. 1 PRIOR ART
FIG. 2A

| $Q_1$ $Q_0$ (n) | $Y_2$ $Y_1$ (n) | $Z_2$ $Z_1$ $Z_0$ (n) | $R$ (n) | $Q_1$ $Q_0$ (n+1) | $V_1$ $V_0$ (n+1) |
|---|---|---|---|---|---|
| 0 0 | 0 0 | 0 0 0 | -7 | 0 0 | 0 0 |
| 0 0 | 0 1 | 0 1 0 | -3 | 0 1 | 1 0 |
| 0 0 | 1 0 | 1 0 0 | +1 | 0 0 | 0 0 |
| 0 0 | 1 1 | 1 1 0 | +5 | 0 1 | 1 0 |
| 0 1 | 0 0 | 0 0 1 | -5 | 1 0 | 0 1 |
| 0 1 | 0 1 | 0 1 1 | -1 | 1 1 | 1 1 |
| 0 1 | 1 0 | 1 0 1 | +3 | 1 0 | 0 1 |
| 0 1 | 1 1 | 1 1 1 | +7 | 1 1 | 1 1 |
| 1 0 | 0 0 | 0 0 0 | -7 | 0 1 | 0 0 |
| 1 0 | 0 1 | 0 1 0 | -3 | 0 0 | 1 0 |
| 1 0 | 1 0 | 1 0 0 | +1 | 0 1 | 0 0 |
| 1 0 | 1 1 | 1 1 0 | +5 | 0 0 | 1 0 |
| 1 1 | 0 0 | 0 0 1 | -5 | 1 1 | 0 1 |
| 1 1 | 0 1 | 0 1 1 | -1 | 1 0 | 1 1 |
| 1 1 | 1 0 | 1 0 1 | +3 | 1 1 | 0 1 |
| 1 1 | 1 1 | 1 1 1 | +7 | 1 0 | 1 1 |

| $Q_1$ $Q_0$ $V_1$ $V_0$ (n) | V Subset | $X_1$ (n) | $Z_1$ $Z_0$ (n) | Z Subset | U(n) Subset | Coset | $Q_1$ $Q_0$ $V_1$ $V_0$ (n+1) |
|---|---|---|---|---|---|---|---|
| 0 0 0 0 | d | 0 | 0 0 | d | (d-d) | A  | 0 0 0 0 |
| 0 0 0 0 | d | 1 | 1 0 | b | (b-d) | C2 | 0 1 1 0 |
| 0 0 1 0 | b | 0 | 0 0 | d | (d-b) | C1 | 0 0 0 0 |
| 0 0 1 0 | b | 1 | 1 0 | b | (b-b) | A  | 0 1 1 0 |
| 0 1 0 0 | d | 0 | 0 1 | c | (c-d) | D2 | 1 0 0 1 |
| 0 1 0 0 | d | 1 | 1 1 | a | (a-d) | B2 | 1 1 1 1 |
| 0 1 1 0 | b | 0 | 0 1 | c | (c-b) | B1 | 1 0 0 1 |
| 0 1 1 0 | b | 1 | 1 1 | a | (a-b) | D2 | 1 1 1 1 |
| 1 0 0 1 | c | 0 | 0 0 | d | (d-c) | B1 | 0 1 0 0 |
| 1 0 0 1 | c | 1 | 1 0 | b | (b-c) | D2 | 0 0 1 0 |
| 1 0 1 1 | a | 0 | 0 0 | d | (d-a) | D1 | 0 1 0 0 |
| 1 0 1 1 | a | 1 | 1 0 | b | (b-a) | B1 | 0 0 1 0 |
| 1 1 0 1 | c | 0 | 0 1 | c | (c-c) | A  | 1 1 0 1 |
| 1 1 0 1 | c | 1 | 1 1 | a | (a-c) | C2 | 1 0 1 1 |
| 1 1 1 1 | a | 0 | 0 1 | c | (c-a) | C1 | 1 1 0 1 |
| 1 1 1 1 | a | 1 | 1 1 | a | (a-a) | A  | 1 0 1 1 |

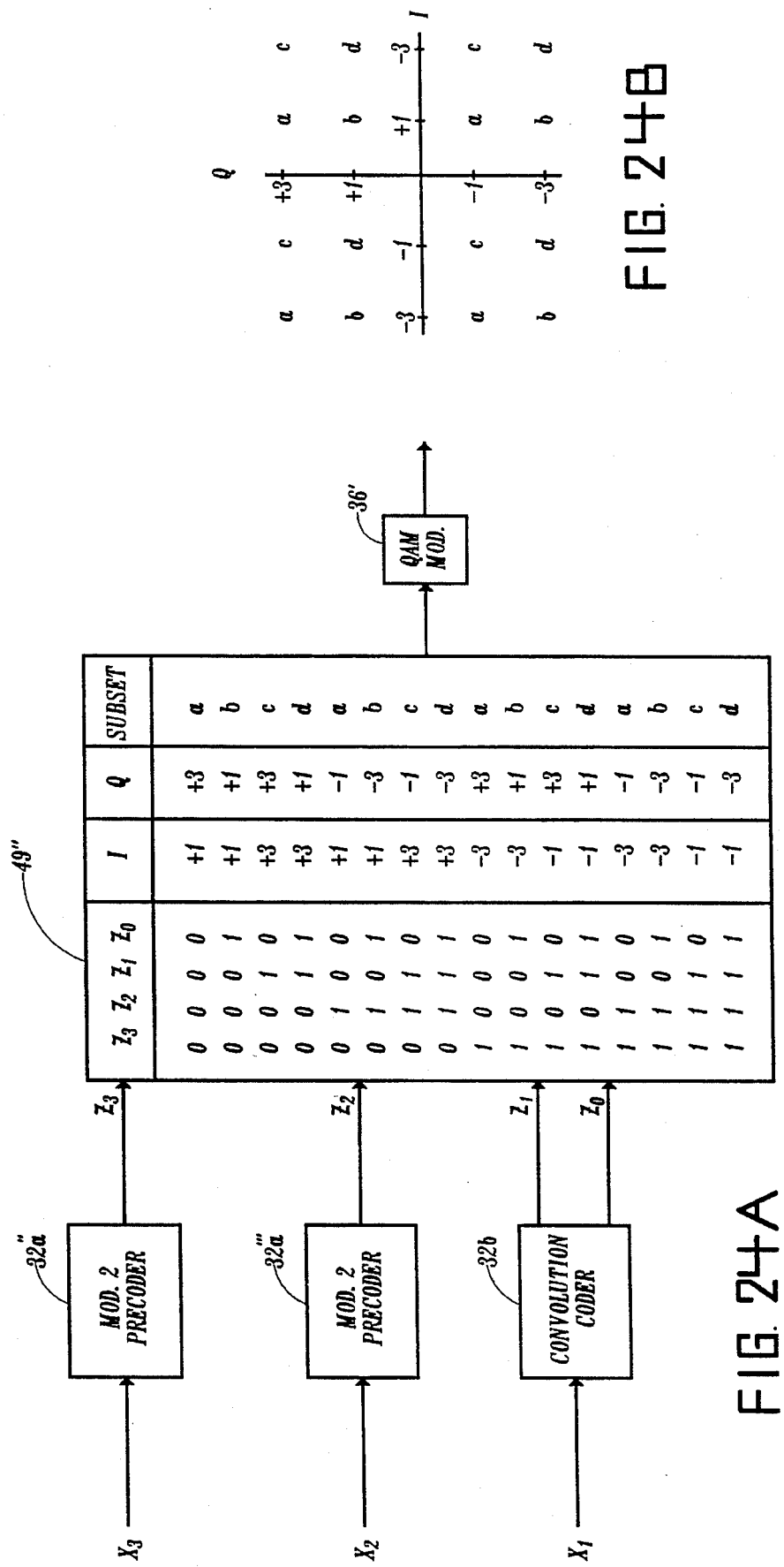

TRELLIS CODED MODULATION SYSTEM FOR DIGITAL TELEVISION SIGNAL

CROSS REFERENCE TO RELATED APPLICATIONS

This application is a division of application Ser. No. 08/272,181, filed Jul. 8, 1994 and entitled TRELLIS CODED MODULATION SYSTEM FOR HDTV.

BACKGROUND OF THE INVENTION

The present invention relates to trellis coded modulation (TCM) transmission and reception systems and particularly concerns the use of TCM in a high definition television (HDTV) application.

Trellis coded modulation is a well known technique for improving the performance of digital transmission and reception systems. Improvements can be achieved in S/N performance at a given power level or alternatively, the transmitted power required to achieve a given S/N performance can be reduced. In essence, TCM comprises the use of a multi-state convolution encoder to convert each k input data bits of an input sequence of data bits into k+n output bits, and is therefore referred to as a rate k/(k+n) convolution encoder. The output bits are then mapped into a sequence of discrete symbols (having $2^{(k+n)}$ values) of a modulated carrier for data transmission. The symbols may, for example, comprise $2^{(k+n)}$ phase or amplitude values. By coding the input data bits in a state-dependent sequential manner, increased minimum Euclidean distances between the allowable transmitted sequences may be achieved leading to a reduced error probability when a maximum likelihood decoder, (e.g. a Viterbi decoder) is used in the receiver.

FIG. 1 generally illustrates a system of the type described above. Each k bits of an input data stream is converted to k+n output bits by a rate k/(k+n) state-dependent sequential convolution encoder 10. Each group of (k+n) output bits is then mapped to one of $2^{(k+n)}$ symbols by a mapper 12. The symbols are transmitted over a selected channel by a transmitter 14. A receiver includes a tuner 16 for converting the signal received over the selected channel to an intermediate frequency signal, which is demodulated by a demodulator 18 to provide a baseband analog signal. The analog signal is appropriately sampled by an A/D 20 to recover the transmitted symbols which are then applied to a Viterbi decoder 22 for recovering the original k data bits.

U.S. Pat. No. 5,087,975 discloses a vestigial sideband (VSB) system for transmitting a television signal in the form of successive M-level symbols over a standard 6 MHz television channel. The symbol rate is preferably fixed at about 684 H (about 10.76 Mega symbols/sec), where H is the NTSC horizontal scanning frequency. This patent also discloses the use of a receiver comb filter having a feed forward delay of 12 symbol clock intervals for reducing NTSC co-channel interference in the receiver. In order to facilitate operation of the receiver comb filter, the source data is precoded by a modulo-filter having a feedback delay of 12 symbol clock intervals. In the receiver of the patented system a complementary modulo postcoder may be used to process the received signal in lieu of the comb filter in the absence of significant NTSC co-channel interference to avoid the degradation of S/N performance attributable thereto.

It is a basic object of the present invention to provide an improved TCM digital transmission system.

It is another object of the present invention to provide a digital transmission and reception system incorporating both TCM techniques and a receiver comb filter for achieving improved S/N performance with NTSC co-channel interference reduction.

It is a further object of the invention to provide a digital transmission and reception system of the foregoing type in which receiver complexity is reduced without significantly degrading performance.

It is yet another object of the invention to provide a novel frame structure and synchronization system for a digital television signal.

BRIEF DESCRIPTION OF THE DRAWINGS

These and other objects and advantages of the invention will be apparent upon reading the following description in conjunction with the drawings, in which:

FIG. 1 is a system block diagram of a conventional TCM system employing an optimal MLSE Viterbi decoder;

FIG. 2A is a system block diagram of a television signal transmitter and receiver including a TCM system employing Viterbi decoding according to the present invention;

FIG. 12 is a table illustrating the operation of the TCM encoder of the invention including the effects introduced by comb filter 42 of the receiver of FIG. 2;

FIGS. 13 shows the resultant effect of combining two subsets in comb filter 42 and the resultant cosets that arise;

FIG. 14 shows the seven cosets that occur in the table of FIG. 13;

FIGS. 24A and 24B illustrate the application of the invention to a QAM system.

DESCRIPTION OF THE PREFERRED EMBODIMENTS

FIG. 2A generally illustrates a TCM system applied to a multilevel VSB HDTV transmission and reception system of the type disclosed in the '975 patent. While the multilevel VSB HDTV application is contemplated in the preferred embodiment of the invention, it will be understood that the invention is more general in nature and thus may be applied to other types of transmission and reception systems, including lower resolution video systems as well as non-video based data systems. Also, other modulation techniques, such as those employing, for example, quadrature amplitude modulation (QAM) may be employed.

With further reference to FIG. 2A, a data source 24 provides a succession of data bytes which may, for example, comprise a compressed HDTV signal, a compressed television signal of NTSC resolution or any other digital data signal. The data bytes are preferably, although not necessarily, arranged in successive frames each including, on an alternating basis, 262 and 263 data segments, each data segment comprising 684 two-bit symbols occurring at a symbol rate of about 10.76 Msymbols/sec. The data bytes from source 24, which also provides a plurality of timing signals, are applied to a Reed-Solomon encoder 26 for forward error correction coding and therefrom to a byte interleaver 28. Byte interleaver 28 reorders the data bytes throughout a frame to reduce the susceptibility of the system to burst noise.

Figure 3:
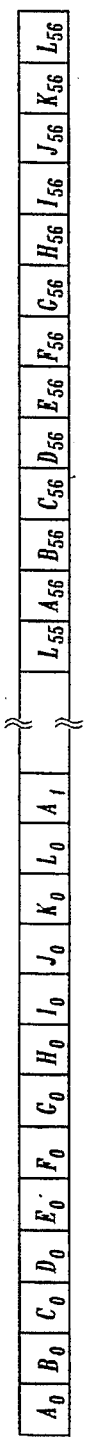
FIG. 3 illustrates the symbol interleaving effected in the transmitter of FIG. 2.

The interleaved data bytes from interleaver 28 are applied to a symbol interleaver 30 which provides in a preferred embodiment two output bit streams $X_1$, $X_2$ at the symbol rate, each bit pair $X_1$, $X_2$ corresponding to a data symbol. In particular, due to the presence of the comb filter in the receiver (to be described in more detail hereinafter), it is desirable to interleave the 2-bit symbols of each data segment among 12 subsegments A–L, each comprising 57 symbols, as shown in FIG. 3. Each subsegment, e.g. subsegment A, thus comprises 57 symbols, e.g. $A_0$–$A_{56}$, separated from each other by 12 symbol intervals. Symbol interleaver 30 effects such by reordering the applied 2-bit symbols of each data byte as four successive symbols of a respective subsegment. Thus, for example, the four 2-bit symbols of the first data byte applied to interleaver 30 are provided as output symbols $A_0$, $A_1$, $A_2$, and $A_3$ of subsegment A, the four 2-bit symbols of the second applied data byte as output symbols $B_0$, $B_1$, $B_2$ and $B_3$ of subsegment B, and so on. This insures that the symbols of each data byte are processed as a unit both in the encoder and the receiver.

The stream of 2-bit symbols from interleaver 30 are coupled to a precoder and trellis encoder 32 for conversion to 3 output bits as will be described in further detail hereinafter. Since unit 32 is characterized by a 12-symbol delay, it may be thought of as comprising 12 parallel encoders each operating at 1/12 the symbol clock rate, with each subsegment generated by interleaver 30 being processed by a respective one of the parallel encoders. The stream of 3-bit symbols developed at the output of unit 32 is applied to a symbol mapper and sync inserter 34 and therefrom to a VSB modulator 36 for transmission as a plurality of 8-level symbols.

The transmitted signal is received by a receiver including a tuner, demodulator and A/D 40 corresponding to blocks 16, 18 and 20 of FIG. 1. The output of unit 40 comprises a stream of multibit (e.g. 8–10 bit) 8-level symbols which are applied by components 50a, b, c, and d of a selector switch 50 (see U.S. Pat. No. 5,260,793 for an exemplary embodiment of a circuit for operating switch 50 to a first processing path comprising a comb filter 42 and a first Viterbi decoder 44 and to a second processing path comprising a second Viterbi decoder 46 and a postcoder 48. Each of the processing paths includes an equalizer 38 coupled between switching components 50b and 50c. The outputs of both Viterbi decoder 44 and postcoder 48 each comprise reconstructions of bit streams $X_1$, $X_2$. Component 50d of selector switch 50 couples one of the applied bit stream pairs $X_1$, $X_2$ to a symbol deinterleaver 52 which reconstructs the original data bytes. These data bytes are then deinterleaved by byte deinterleaver 54 and error-corrected by Reed-Solomon decoder 56 for application to the remainder of the receiver.

Figure 2B:
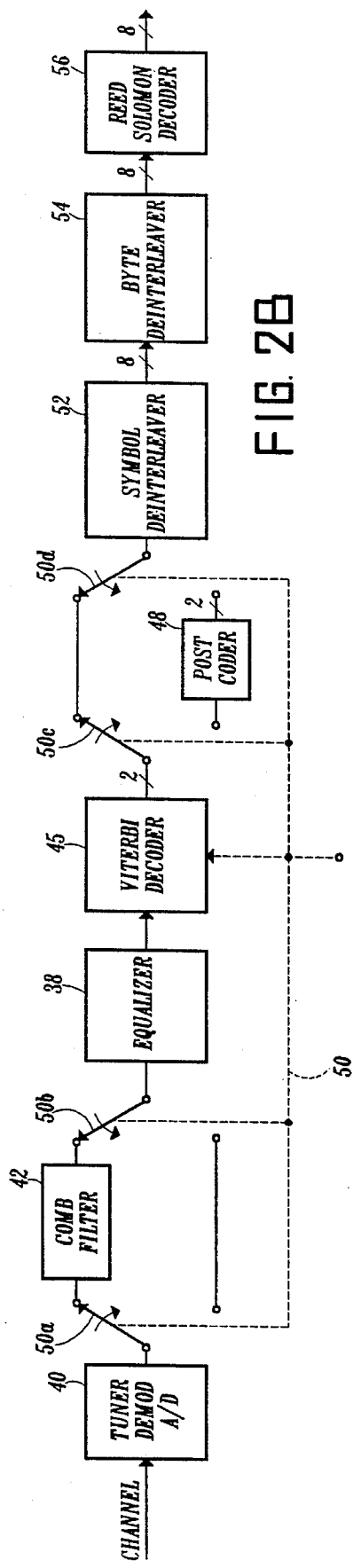
FIG. 2B is a block diagram of an alternate embodiment of the receiver of FIG. 2A.

An alternate embodiment of the receiver of FIG. 2A is shown in FIG. 2B. This embodiment is generally similar to the system of FIG. 2A except that only one Viterbi decoder 45 is provided. More specifically, Viterbi decoder 45 is responsive to a control signal from selector switch 50 for assuming a first configuration for implementing the functions of Viterbi decoder 4 when the first processing path is selected and for assuming a second configuration for implementing the functions of Viterbi decoder 46 when the second processing path is selected.

Figure 4:
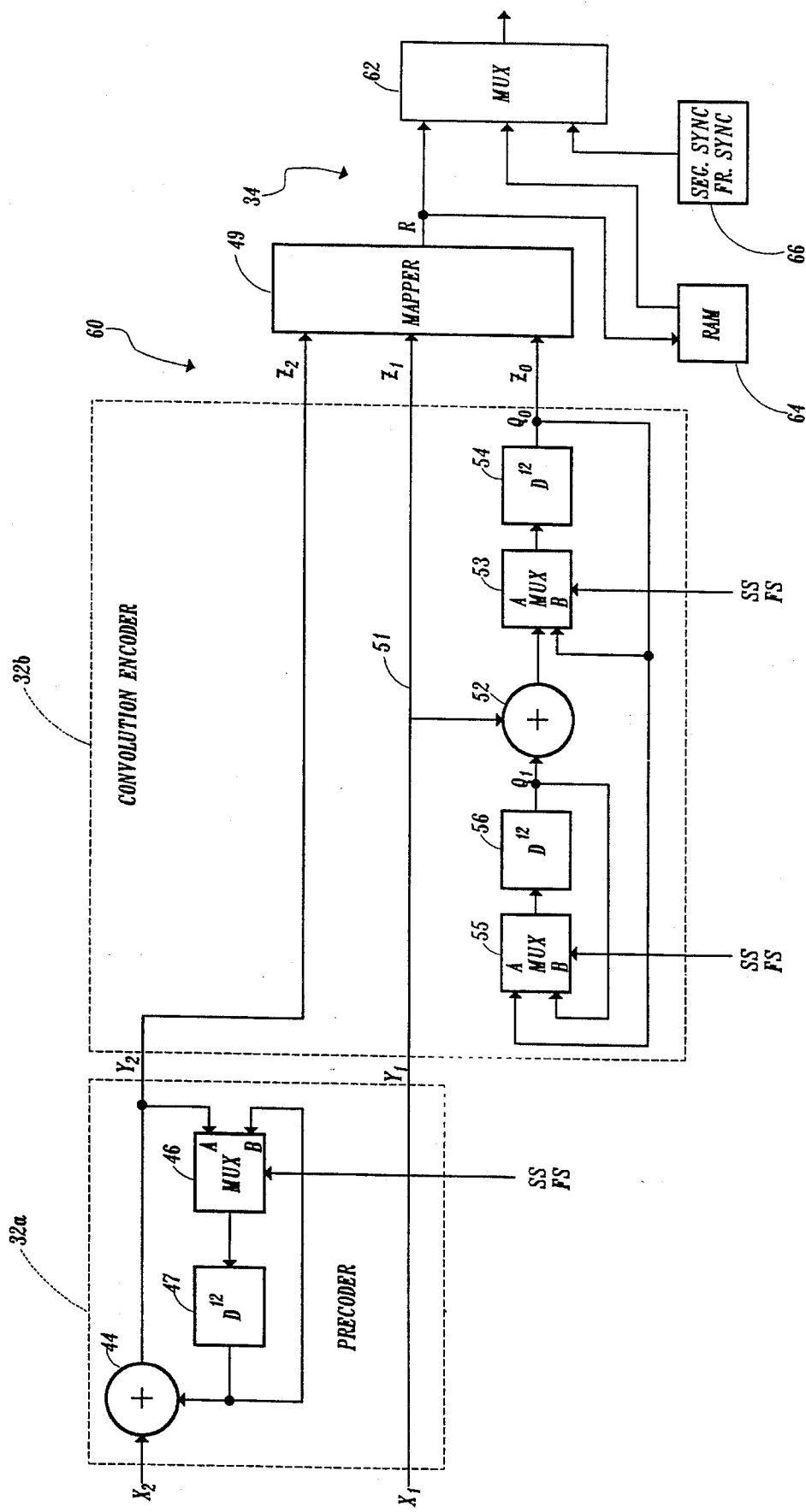
FIG. 4 is a block diagram illustrating circuits 32 and 34 of FIG. 2 in more detail.

Referring to FIG. 4, unit 32 comprises a modulo-2, feedback precoder 32a receiving the symbols (each symbol being identified as bits $X_1$, $X_2$) from interleaver 30 for developing output bits $Y_1$, $Y_2$. More specifically, precoder 32a comprises a modulo-2 summer 44 having a first input connected for receiving bit $X_2$ and a second input connected to the summer output, which develops output bit $Y_2$, by a multiplexer 46 and a 12-symbol delay element 47. The output of delay element 47 is also coupled back to its input by multiplexer 46. Output bit $Y_2$ of summer 44 is applied as bit $Z_2$ to one input of a symbol mapper 49, which is shown in more detail in FIG. 5.

Uncoded bit $Y_1$ from precoder 32a is applied to a rate ½, 4-state, systematic feedback convolution encoder 32b for conversion to output bits $Z_1$ and $Z_0$. Convolution encoder 32b comprises a signal path 51 for applying bit $Y_1$ directly to a second input of symbol mapper 49 as bit $Z_1$ and to one input of a modulo-2 summer 52. The output of summer 52 is applied through a multiplexer 53 to the input of a 12-symbol delay element 54, whose output is applied to a third input of symbol mapper 49 as bit $Z_0$ and through a second multiplexer 55 to the input of a second 12-symbol delay element 56. The output of delay element 56 is applied to the second input of summer 52. The outputs of delay elements 54 and 56 are also coupled back to their respective inputs by multiplexers 53 and 55. Each of the delay elements 47, 54 and 56 is clocked at the symbol rate (about 10.76 M symbols/sec). It will be appreciated that each subsegment A–L (see FIG. 3) will be independently processed by precoder 32a and convolution encoder 32b on account of the 12-symbol delay elements which characterize their respective operations.

Convolution encoder 32b may take various other forms from that shown in FIG. 4 without departing from the invention. For example, the number of encoder states may differ from that shown, feedforward architectures may be used rather that the disclosed feedback structure and non-systematic coding may be employed in either a feedback or feedforward arrangement.

Multiplexers 46, 53 and 55 are provided to allow for sync insertion during which times their respective B inputs are selected. At all other times the A inputs of the multiplexers are selected. Considering operation of the circuit when the A input of the multiplexers are selected and disregarding, for the moment, the effect of precoder 32a, the operation of convolution encoder 32b and mapper 49, hereinafter referred to as trellis encoder (TE) 60, is illustrated in the table of FIG. 6. The first column of the Table represents the four possible states $Q_1 Q_0$ of the delay elements 56 and 54 of convolution encoder 32b at an arbitrary time n. These states are 00, 01, 10 and 11. The second column represents the possible values of bits $Y_2 Y_1$ for each of the states $Q_1 Q_0$ of encoder 32b at time n. The third column of the table represents the values of output bits $Z_2 Z_1 Z_0$ at time n for each combination of bits $Y_2 Y_1$ and encoder states $Q_1 Q_0$ at time n. For example, when encoder 32b is in state $Q_1 Q_0=01$, bits $Y_2 Y_1=10$ result in output bits $Z_2 Z_1 Z_0=101$. The fourth column of the table, labeled R(n), represents the amplitude of the symbol provided by symbol mapper 49 (see FIG. 5) in response to output bits $Z_2 Z_1 Z_0$. Since there are three output bits, 8 symbol levels (−7, −5, −3, −1, +1, +3, +5 and +7) are provided. Output bits $Z_2 Z_1 Z_0=101$, for example, result in symbol level +3 being generated by symbol mapper 49. Finally, the fifth column of the table represents the state of encoder 32b at time (n+1). It will be understood that since each of the delay elements 54 and 56 is 12-symbols long, for the symbols of each subsegment A–L the states $Q_1 Q_0$ of encoder 32b at times n and (n+1) represent successive encoder state transitions.

It will be observed that the 8-level symbols developed at the output of mapper 49 are symmetrical around the zero level. To facilitate signal acquisition in the receiver, it is preferred to offset each symbol by a given amount (e.g. +1 unit) to in effect provide a pilot component. The symbols and pilot component are then applied through a multiplexer 62 to modulator 36 (see FIG. 2) where they are used to modulate a selected carrier for transmission in a suppressed carrier VSB form as described in the previously mentioned '975 patent. The output of mapper 49 is also applied to the input of a RAM 64, whose output is applied to a second input of multiplexer 62. A third input of multiplexer 62 is supplied from a source 66 of segment and frame sync signals.

Figure 5:
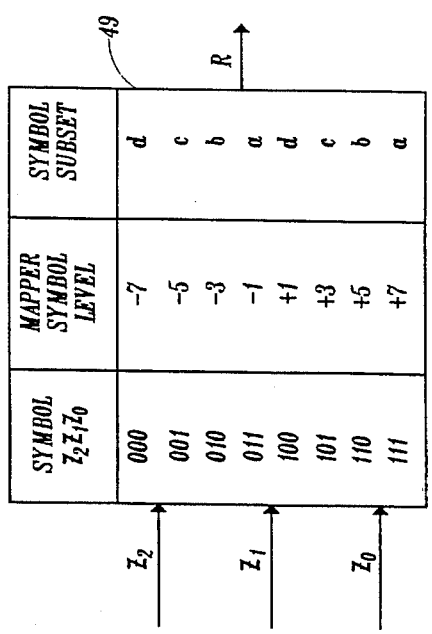
FIG. 5 is a diagram illustrating the operation of mapper 49 of FIG. 4.
Figures 6, 7:
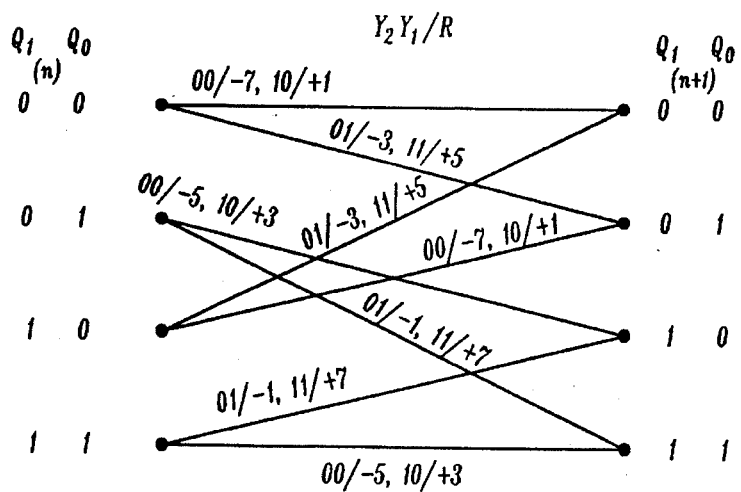
FIG. 6 is a table illustrating the operation of convolution encoder 32b of FIG. 4.
FIG. 7 is a trellis state transition diagram based upon the table of FIG. 6.

With further reference to symbol mapper 49 of FIG. 5, will be observed that the 8 symbol levels are divided into 4 subsets a, b, c, and d, each subset being identified by a particular state of output bits $Z_1 Z_0$. Thus, output bits $Z_1 Z_0=00$ selects symbol subset d, $Z_1 Z_0=01$ selects symbol subset c, $Z_1 Z_0=10$ selects symbol subset b and $Z_1 Z_0=11$ selects subset a. Within each subset, the respective symbol amplitudes differ by a magnitude of 8 units. It will also be observed that successive symbol levels (−7, −5), (−3, −1), (+1, +3) and (+5, +7) are selected by common states of output bits $Z_2 Z_1$. Thus, for example, output bits $Z_2 Z_1=00$ selects both symbol amplitude levels −7 and −5, and so on. Both of the foregoing attributes of symbol mapper 49 are useful in achieving reduced receiver complexity as will be described in more detail hereinafter.

FIG. 7 is a state transition diagram for convolution encoder 32b derived from the table of FIG. 6. The diagram illustrates the four states of the encoder and the various transitions there between. In particular, each state has two parallel branches, each extending to the same or another state. The branches are labeled with the input bits $Y_2 Y_1$ causing the state transition and the resulting output R of mapper 49. As will be explained in further detail hereinafter, this state diagram may be used to design an optimum maximum likelihood sequence estimation (MLSE) Viterbi decoder in the receiver for recovering estimations of bits $Y_2$ and $Y_1$ as is well known in the art.

Figure 8:
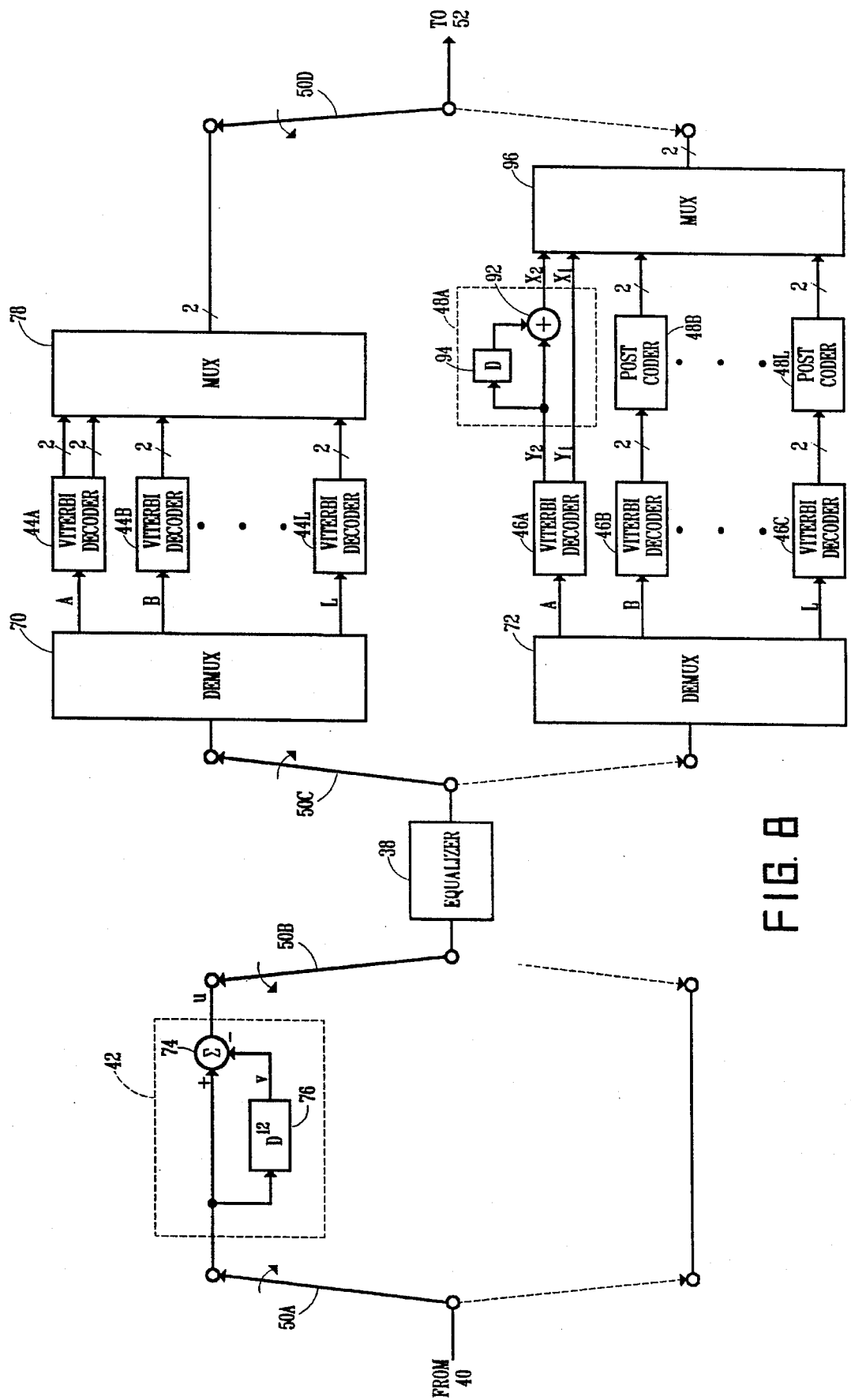
FIG. 8 is a block diagram illustrating circuits 42, 44, 46 and 48 of FIG. 2 in more detail.

FIG. 8 illustrates the receiver decoding aspects of the invention in more detail. The multibit symbol values from tuner, demodulator, A/D 40 are applied to a first demultiplexer 70 through the first processing path comprising comb filter 42 and equalizer 38 and to a second demultiplexer 72 through the second processing path comprising equalizer 38. Comb filter 42 comprises a feedforward filter including a linear summer 74 and a 12 symbol delay element 76. As more fully explained in the previously mentioned '975 patent, the filter is operable for reducing NTSC co-channel interference by subtracting from each received symbol, the symbol received 12 symbol intervals earlier. Because of the symbol interleaving provided in the transmitter, the comb filter independently operates on each of the subsegments for providing successive combed outputs of the form $A_1–A_0$, $B_1–B_0$, etc. These combed outputs are demultiplexed by demultiplexer 70 into 12 separate outputs, each corresponding to a respective one of the subsegments A–L. Each combed subsegment is applied by demultiplexer 70 to a respective Viterbi decoder 44A–44L which is operated at a rate of $1/12$ the symbol clock rate (fs). Each of the decoders 44A–44L provides a pair of output decoded bits comprising estimations of input bits $X_1 X_2$, the decoded bits being multiplexed into an interleaved bit stream as shown in FIG. 3 by a multiplexer 78.

The interleaved symbols from unit 40 are also demultiplexed by demultiplexer 72 into the 12 separate subsegments A–L, each being applied to a respective one of the Viterbi decoders 46A–46L. It will thus be seen that each of the original data bytes from source 24 are processed as a unit by a respective one of the decoders 46A–46L. For example, the data byte represented by symbols $A_3 A_2 A_1 A_0$ is processed by decoder 46A, and so on. The same is of course true for decoders 44A–44L, except that the processed symbols have previously been combed by filter 42.

Figure 9:
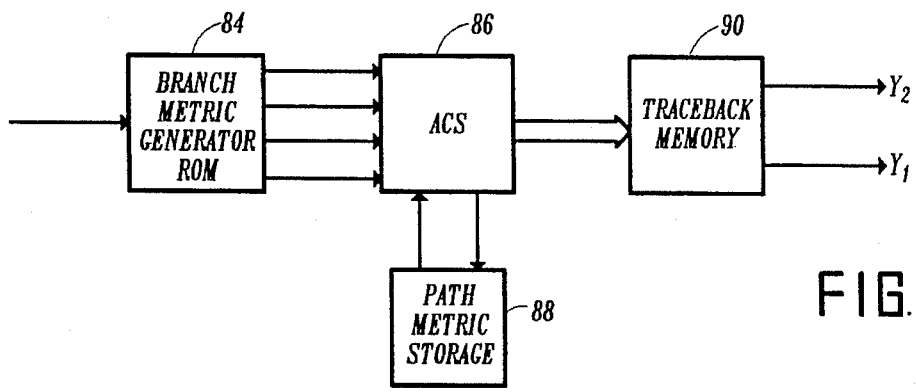
FIG. 9 is a functional block diagram of optimal MLSE Viterbi decoders 46A–46L of FIG. 8.

Each of the decoders 46A–46L may comprise a substantially identical device operating at the rate of fs/12 and programmed according to the state diagram of FIG. 7 for effecting optimum MLSE Viterbi decoding for recovering estimations of bits $Y_2$ and $Y_1$ as is well known in the art. In particular, each of the decoders 46A–46L is programmed to generate 4 branch metrics, typically using an appropriately programmed ROM, each representing the difference between the received symbol level (i.e. an 8–10 bit value) and the closest one of the two subset levels of each of the symbol subsets a, b, c, and d. FIG. 9 illustrates a Viterbi decoder manufactured by LSI Logic Corp. which may be programmed to perform the functions of each of decoders 46A–46L. The decoder comprises a branch metric generator ROM 84 responsive to the received symbols for generating and applying 4 branch metrics to an add, compare and select (ACS) unit 86. ACS unit 86 is bidirectionally coupled to a path metric storage memory 88 and also supplies a traceback memory 90. In general, ACS unit 86 adds the branch metrics generated by generator 84 to the previous path metrics stored in memory 88 to generate new path metrics, compares the path metrics emanating from the same states and selects the ones with the lowest path metrics for storage. Traceback memory 90, after a number of branches have been developed, is operable for selecting a surviving path and generating estimations of the bits $Y_2$ and $Y_1$ that would have produced the surviving path.

It will be recalled that in the foregoing analysis the effect of precoder 32a on the input bit stream had been ignored. While the function of the precoder will be described in further detail hereinafter, suffice it for now to recognize that input bit $X_2$ differs from bit $Y_2$ due to the operation of the modulo-2 precoder. The output of each Viterbi decoder 46A–46L in FIG. 8 comprises only an estimation of bit $Y_2$, not input bit $X_2$. Consequently, a complementary modulo-2 postcoder 48A–48L is used in the receiver to recover estimations of input bits $X_1$ and $X_2$ from each respective decoder 46A–46L. Each postcoder 48A–48L comprises a direct path between input bit $Y_1$ and output bit $X_1$ and a feedforward circuit in which output bit $Y_2$ is applied directly to one input of a modulo-2 adder 92 and to a second input of adder 92 via a one-symbol delay element 94. The output of adder 92 comprises an estimation of input bit $X_2$. Finally, the decoded bits $X_1$, $X_2$ from postcoders 48A–48L are multiplexed into an interleaved bit stream as shown in FIG. 3 by a multiplexer 96.

Figure 10:
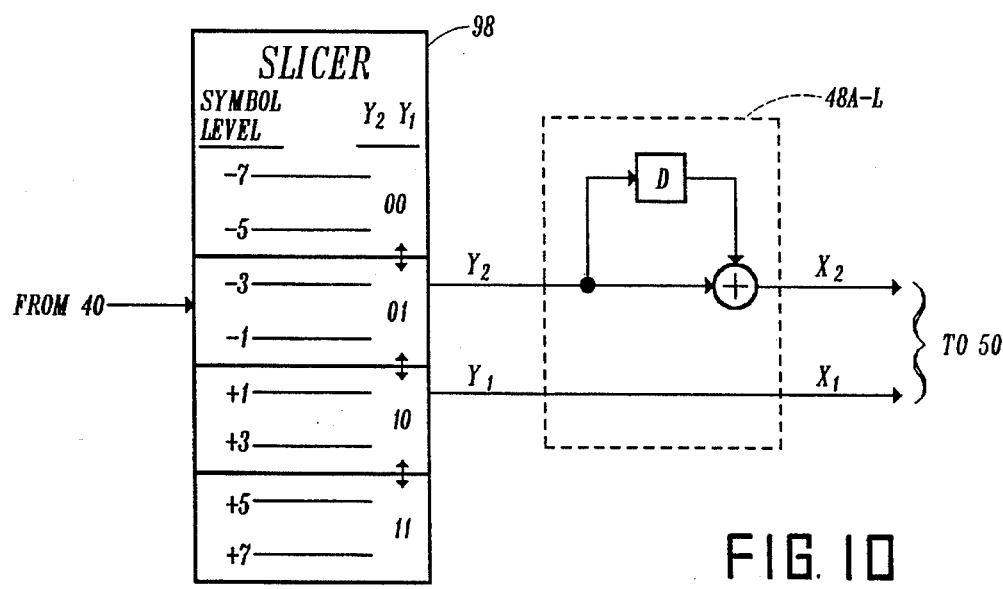
FIG. 10 is a diagram showing a circuit which may be used in place of Viterbi decoders 46A–46L of FIG. 8 for recovering estimations of bits $Y_1$ and $Y_2$.

In an alternate embodiment of the invention, each of the Viterbi decoders 46A–46L may be replaced by a slicer 98 as illustrated in FIG. 10 to provide a cost reduced receiver in cases where the received signal is characterized by a relatively high S/N ratio. This is frequently the case in cable transmissions which normally exhibit a better S/N ratio than terrestrial transmissions. A tradeoff is therefore made between TCM coding gain and receiver complexity and cost. Referring to FIG. 10, slicer 98 is characterized by three slice levels (−4, 0 and +4). A received symbol having a level more negative than −4 will be decoded by slicer 98 as bits $Y_2Y_1=00$, a level between −4 and 0 as bits $Y_2Y_1=01$, a level between 0 and +4 as bits $Y_2Y_1=10$ a level more positive than +4 as bits $Y_2Y_1=11$. As before, bits $Y_2Y_1$ are converted to an estimation of bits $X_2X_1$ by a respective postcoder 48A–48L. Referring back to mapper 49 of FIG. 5, it will be seen that slicer 98 effects proper decoding of the received symbols because successive symbol levels are represented by common values of bits $Z_2 Z_1$, as previously mentioned. This embodiment of the invention therefore, in effect, implements a 4-level transmission and reception system which provides an equivalent bit rate as the 8-level TCM system, but with worse S/N performance since the TCM coding gain is not realized.

Figure 11:
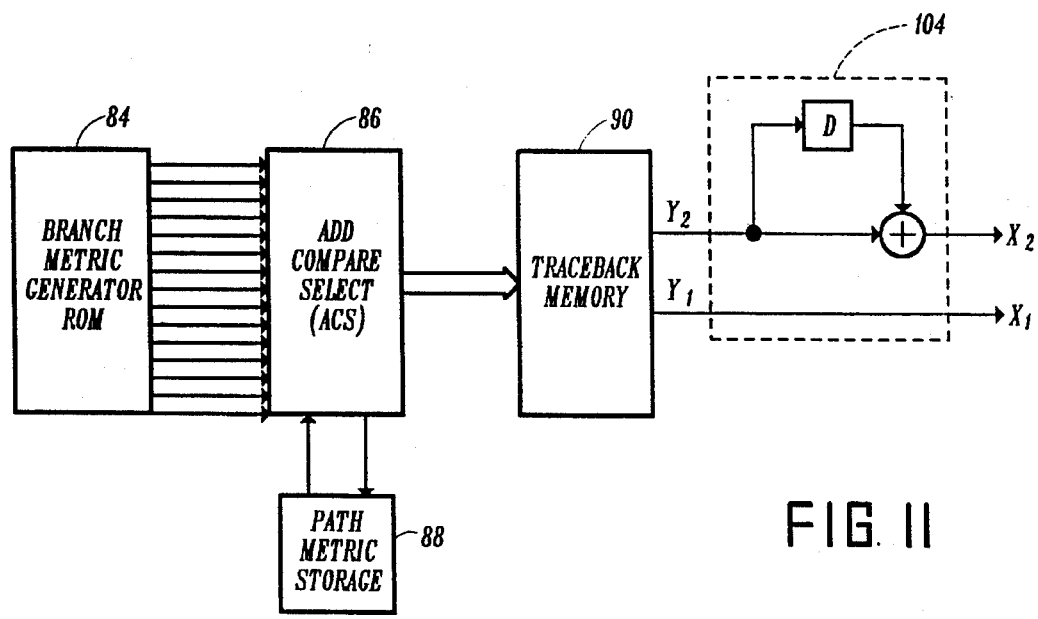
FIG. 11 is a functional block diagram of optimal MLSE Viterbi decoders 44A–44L of FIG. 8.

Referring back to FIG. 8, although comb filter 42 has the desired affect of reducing NTSC co-channel interference, it also increases the complexity of decoders 44A–44L where optimum MLSE Viterbi decoding is used to recover bits $X_1$ and $X_2$. In particular, an optimum MLSE Viterbi decoder must take into account not only the state of the encoder, but also the state of delay element 76 of comb filter 42. Since there are 4 encoder states and 4 possible ways to enter each state (i.e. there are 4 possible states of delay element 76 for each state of encoder 32b), an optimum decoder must process a 16-state trellis. In addition, the decoder must account for 4 branches entering each state whereas only 2 branches enter each encoder state. Such a decoder is illustrated in FIG. 11 and, while complex in nature, its design is relatively straight forward. In particular, while the functionality of the decoder is similar to that shown in FIG. 9 (the same reference numerals are therefore used), its complexity is greatly increased including the requirement to generate 15 branch metrics instead of just 4. The branch metrics represent the difference between a received symbol level and each of the possible 15 constellation points at the output of comb filter 42 (i.e. the linear combination of the 8-level symbols provides 15 possible output levels).

The table of FIG. 12 illustrates a technique according to the invention for reducing the complexity, and thereby the cost, of the Viterbi decoders 44A–44L used to recover bits $X_1$ and $X_2$ from the output of comb filter 42. This simplification, which is made possible by precoding bit $X_2$ as shown in FIG. 4, is achieved by ignoring some of the state information from delay element 76 of comb filter 42 in constructing the trellis diagram forming the basis of the decoder. In particular, as will be explained in further detail below, decoding simplification is achieved according to this aspect of the invention by considering only the information identifying the subsets a, b, c and d of the 8 possible states of delay element 76 of the comb filter. If the output of delay element 76 is represented by reference letter V, the combined state of the encoder and channel can be represented as $Q_1(n)Q_0(n)V_1V_0(n)$, where subset $V_1 V_0(n)$=subset $Z_1 Z_0(n-1)$. That is, the state of delay element 76 is represented by the subset of the previous symbol.

Referring now to the table of FIG. 12, the first column represents the state of the combined encoder and channel (using only subset information to represent the state of delay element 76) $Q_1Q_0V_1V_0$ at time n. As shown, there are 8 possible states 0000, 0010, 0100, 0110, 1001, 1011, 1101 and 1111 (note that in all instances $Q_1=V_0$). These eight states are derived from the last two columns of the table of FIG. 6 which gives the states $Q_1 Q_0$ of encoder 32b and the associated $V_1 V_0$ subset of the output V of delay element 76 at an arbitrary time (n+1). It will be noted that the $V_1 V_0$ subset at time (n+1) is the same as output bits $Z_1 Z_0$ at time n (see the third column of the FIG. 6 table). Each state $Q_1Q_0V_1V_0$ of the combined encoder and channel is listed twice in the table of FIG. 12, once for each possible value of input bit $X_1$ (see the third column of the table). The fourth column of the table represents the subset $Z_1Z_0$ at time n for each encoder/channel state and each value of input bit $X_1$. These values are derived on the basis of the relationships $Z_1=X_1$ and $Z_0=Q_0$. Both the $V_1 V_0$ subset in the first column of the table and the $Z_1Z_0$ subset comprising the fourth column of the table are identified by the subset identifiers (a–d) shown in mapper 49 of FIG. 5 in the second and fifth columns respectively of the table.

Figure 13:
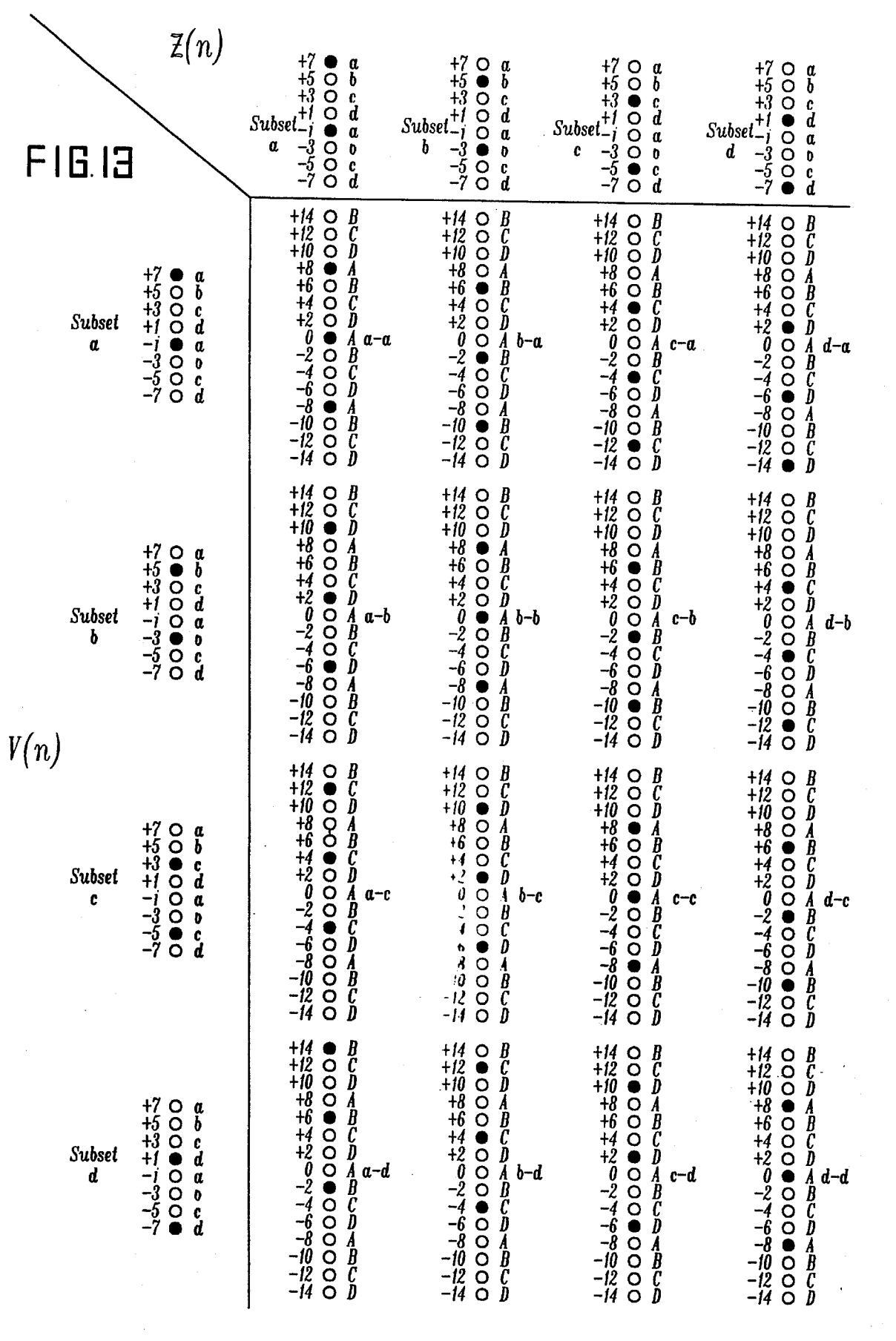

Referring back to FIG. 8, the output of linear summer 74 of comb filter 42 applied to each decoder 44A–44L is identified by the letter U and comprises the value of a received symbol minus the value of the previous symbol. This value is represented in the sixth column of the table of FIG. 12 as the difference between the Z subset $Z_1 Z_0$ and the V subset $V_1 V_0$ in terms of the subset identifiers (a–d). Thus, for example, the U subset at time n for the first row of the table is (d—d), for the fifth row (c–d), and so on. In FIG. 13 the possible values of the U subset are derived by substracting each V subset (a, b, c and d) from each Z subset (a, b, c and d). In particular, each possible Z subset is identified along the top of the Figure by the darkened circles corresponding to the levels of the respective subsets. For example, subset a comprises levels −1 and +7 of the 8 levels, subset b comprises levels −3 and +5, and so on. Likewise, each possible V subset is identified along the left-hand margin of the Figure. The results of subtracting each V subset from each Z subset to derive the U subsets (U=Z−V) are shown in the interior of the Figure. For example, the U subset (a—a), see the last row of the table of FIG. 12, is derived by subtracting the a subset levels −1 and +7 from the a subset levels −1 and +7, which gives the three levels +8, 0, −8 as shown in the upper left-hand corner of FIG. 13. Similarly, the U subset (a–b), see the 8th row of the FIG. 12 table, is derived by subtracting the b subset levels −3 and +5 from the a subset levels −1 and +7, which gives the three levels +10, +2, −6 as shown, and so on.

Figure 14:
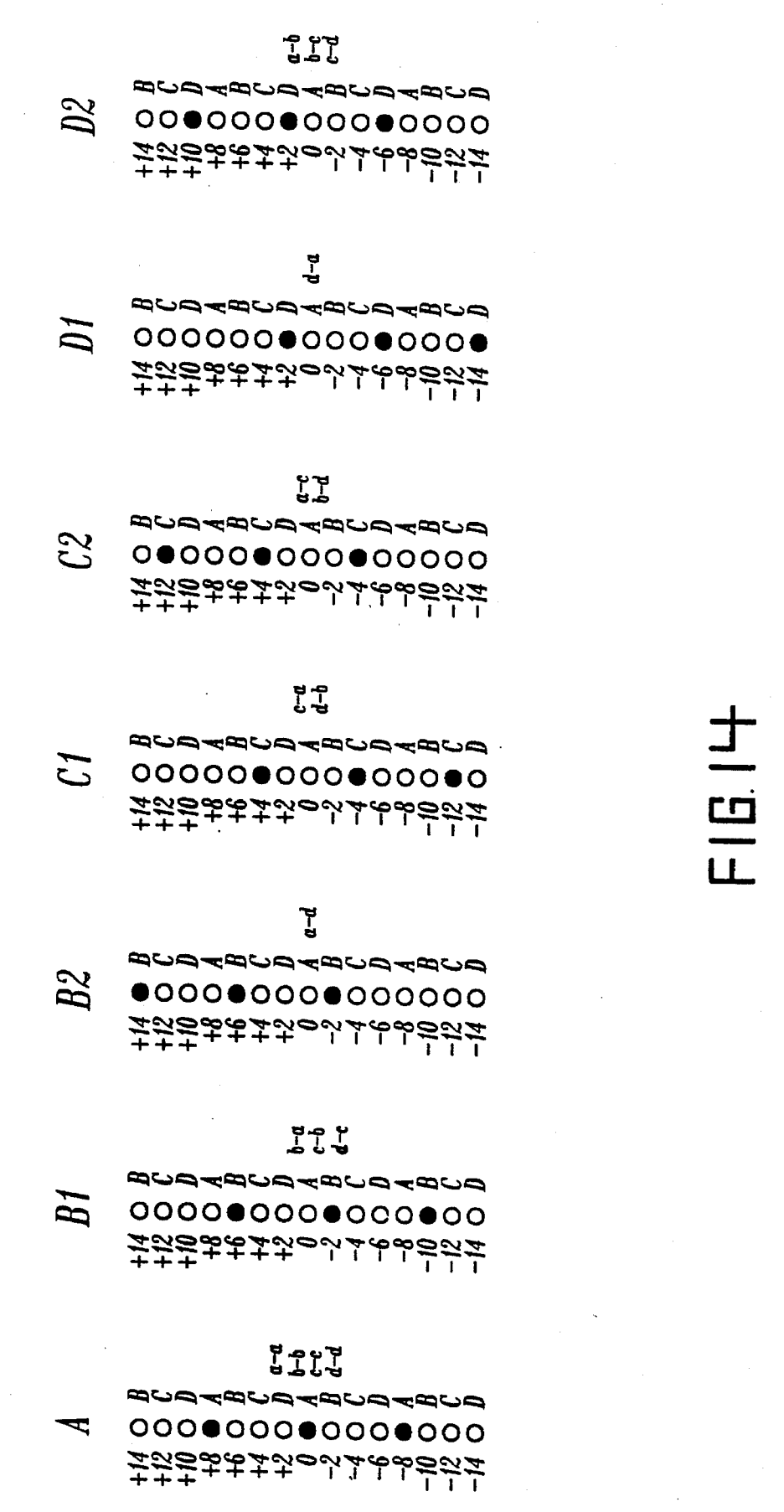

Examination of the 16 U subsets shown in FIG. 13 reveals that each belongs to one of 7 common subsets hereinafter referred to as cosets. These 7 cosets are shown in FIG. 14 and identified as cosets A (U subsets a—a, b—b, c—c and d—d), B1 (U subsets b-a, c-b and d-c), B2 (U subset a-d), C1 (U subsets c-a and d-b), C2 (U subsets a-c and b-d), D1 (U subset d-a) and D2 (U subsets a-b, b-c and c-d). The coset for each U subset is also shown in the 7th column of the table of FIG. 12. It will be observed that each coset comprises 3 of 15 possible levels.

Figure 15:
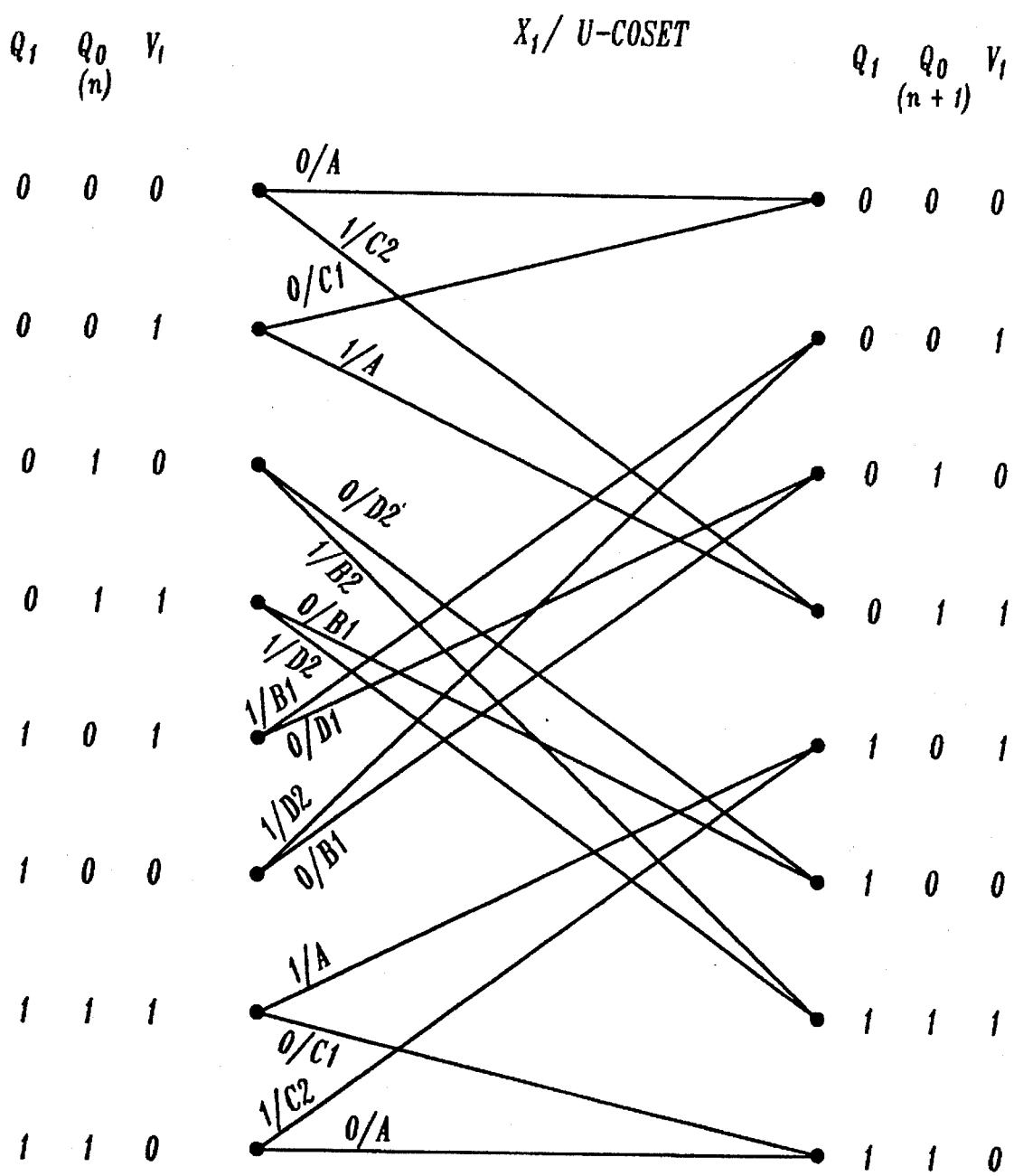
FIG. 15 is a trellis state transition diagram based on the table of FIG. 12.

The final column of the table of FIG. 12, which corresponds to the last two columns of the table of FIG. 6, represents the state $Q_1Q_0V_1V_0$ of the encoder/channel at time (n+1). The first and last columns of the table can now be used to construct a trellis state transition diagram for the combined encoder/channel as shown in FIG. 15. In this Figure, $V_0$ has been disregarded since it is redundant with $Q_1$. The trellis state transition diagram thus comprises 8 states, with two branches emanating from each state. Each branch is labeled with the input bit $X_1$ and the coset A, B1, B2, C1, C2, D1 and D2 associated with the respective transition. The trellis diagram of FIG. 15 can now be used to provide the basis of a reduced complexity Viterbi decoder (for each of decoders 44A–44L) for estimating input bit $X_1$ from the output U of summer 74 of comb filter 42. This decoder, which comprises an alternate embodiment of the optimum Viterbi decoder of FIG. 11, may take the form of the Viterbi decoder illustrated in FIG. 16. The apparatus used to implement this Viterbi decoder may be similar to that used in the decoder of FIGS. 9 and 11 and thus comprises a branch metric generator 84, an ACS unit 86, a path metric storage memory 88 and a traceback memory 90. In the case of the decoder of FIG. 16, branch metric generator 84 is programmed to generate seven branch metrics each representing the squared Euclidean distance between the symbol level U at the output of summer 74 of comb filter 42 and the nearest one of the 3 valid levels of each of the 7 cosets A, B1, B2, C1, C2, D1 and D2. For example, assuming a level U=(−6), the seven branch metrics would be derived as follows: A=$2^2$=4; B1=$4^2$=16; B$^2$=$4^2$=16; C1=$2^2$=4; C2=$2^2$=4; D1=0 and D2=0. Based on these branch metrics and the trellis diagram of FIG. 15, the decoder provides an estimation of bit $X_1$ and the associated coset identification, which are known from the surviving path decisions made by the decoder.

Figure 16:
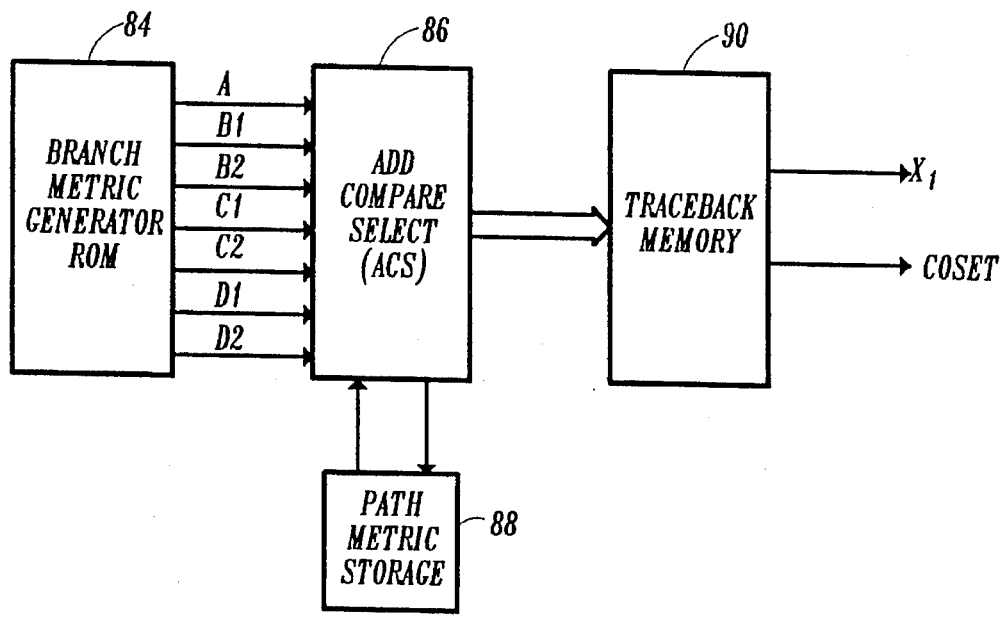
FIG. 16 is a functional block diagram of a Viterbi decoder programmed on the basis of the trellis diagram of FIG. 15.

It is still, however, necessary to provide an estimation of input bit $X_2$ and this may be done in response to the coset information provided by the Viterbi decoder of FIG. 16. The ability to so estimate bit $X_2$ is facilitated by providing precoder 32a in the path of input bit $X_2$ in FIG. 4. In particular, it will be seen that precoder 32a is configured such that whenever input bit $X_2(n)$=1, the corresponding output bit $Y_2(n)$ of the precoder is different from the previous output bit $Y_2(n-1)$. That is, if $Y_2(n) æ Y_2(n-1)$, then $X_2(n)$=1. Also, if $X_2(n)$=0, then the corresponding output bit $Y_2(n)$ will be equal to the previous output bit $Y_2(n-1)$. That is, if $Y_2(n)=Y_2(n-1)$, then $X_2(n)$=0. Also, with reference to mapper 49 of FIG. 5, it will be observed that a positive level symbol is provided when $Z_2$ (i.e. $Y_2$)=1 and a negative level symbol is provided when $Z_2=Y_2$=0.

Figure 17:
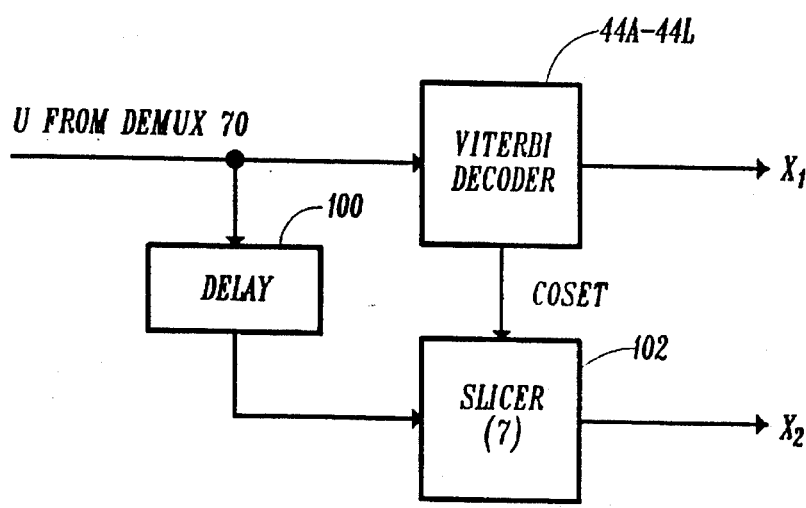
FIG. 17 is a block diagram illustrating the use of the Viterbi decoder of FIG. 16 to recover estimations of transmitted bits $X_1$ and $X_2$.

The foregoing characteristics are used to estimate bit $X_2$ as shown in FIG. 17. The symbol level U at the output of summer 74 of comb filter 42 is applied through a delay 100 (chosen to match the delay of Viterbi decoders 44A–44L) to one input of a plurality, i.e. 7, of slicers 102. The coset identification signal at the output of Viterbi decoder 44A–44L is applied to the second input of slicer 102. An estimation of bit $X_2$ is developed by slicer 102 by determining whether the U symbol level from comb filter 42 is closer to one of the outer levels (e.g. levels +8 or −8 of coset A) of the coset A, B1, B2, C1, C2, D1 or D2 identified by the respective Viterbi decoder 44A–44L, in which case bit $X_2$ is decoded as a 1, or whether it is closer to the intermediate level (e.g. level 0 of coset A) of the identified coset level, in which case bit $X_2$ is decoded as a 0. The foregoing is based on the fact that the positive outer level (e.g. +8 of coset A) of each of the cosets results only when successive $Y_2$ bits at the output of precoder 32a are characterized by the values $Y_2(n)$=1 and $Y_2(n-1)$=0, the negative outer level (e.g. −8 of coset A) of each coset only when successive $Y_2$ bits have the values $Y_2(n)$=0 and $Y_2(n-1)$=1 and the intermediate level (e.g. 0 of coset A) of each coset only when successive $Y_2$ bits have values $Y_2(n)$=1 and $Y_2(n-1)$=1 or $Y_2(n)$=0 and $Y_2(n-1)$=0. In the two former cases $X_2(n)$=1 [since $Y_2(n)æY_2(n-1)$] and in the latter case $X_2(n)$=0 [since $Y_2(n)=Y_2(n-1)$].

Finally, it will be understood that the inclusion of precoder 32a in the path of input bit $X_2$ requires the incorporation of a complementary postcoder 104 in the path of estimated bit $X_2$ when an optimal MLSE Viterbi decoder is used to process the output of comb filter 42 as shown in FIG. 11. A complementary postcoder is not required in the case of the circuit of FIG. 17 since estimated bit $X_2$ is directly produced.

As previously described, the data provided by source 24 is preferably arranged in successive data frames, each comprising, a plurality of data segments of 684 symbols, although the following aspects of the invention are equally applicable to arrangements having different numbers of data segments per frame and different numbers of symbols per data segment. It is further desirable to incorporate a frame sync signal, which may comprise one or more pseudo-random sequences, in the first data segment of each frame and a data segment sync signal in the first four symbol positions of each data segment. Referring back to FIG. 4, the frame and segment sync signals are inserted at the appropriate times into the data stream at the output of multiplexer 62 by frame and data segment sync generator 66. During these intervals, the B input of multiplexer 46 of precoder 32a and the B inputs of multiplexers 53 and 55 of convolution encoder 32b are selected. Also, the last 12 symbols of the last data segment of each frame are read into memory 64 and copied into the last 12 symbol intervals of the frame sync segment at the output of multiplexer 62. As will be explained in further detail hereinafter, the foregoing provisions are effective to insure that in the receiver symbols from each of the subsegments A–L (see FIG. 3) are only processed with symbols from the same subsegment.

Figure 18:
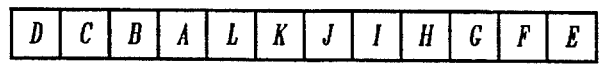
FIG. 18 illustrates the states of delay elements 48, 54 and 56 of FIG. 4 after a segment sync interval.
Figure 19:
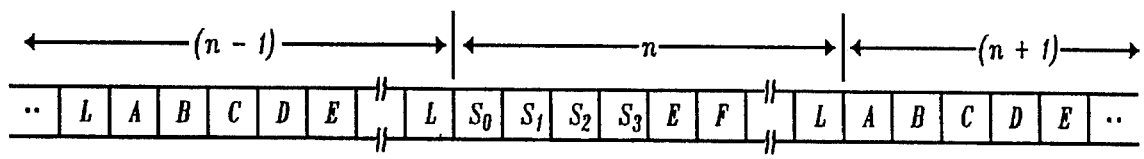
FIG. 19 illustrates the format of the signal developed at the output of multiplexer 62 of FIG. 4 in the vicinity of a segment sync signal.

More specifically, during the segment sync interval 4 predetermined sync symbols $S_0$, $S_1$, $S_2$ and $S_3$ are inserted into the data stream by generator 66 and multiplexer 62 while, at the same time, input data from source 24 is temporarily suspended. Also, since the outputs of delay elements 48, 54 and 56 are being fed-back to their respective inputs, each of the delay elements will be characterized as shown in FIG. 18 immediately following the segment sync interval, wherein the state of the delay elements is defined by a symbol from subsegment E. The composite signal in the vicinity of the segment sync signal $S_0$, $S_1$, $S_2$ and $S_3$ is illustrated in FIG. 19, in which the data segment containing the sync signal occurs at time n and the preceding and following segments occur at times (n−1) and (n+1) respectively. In connection with this Figure, it will be noted that subsegment integrity is maintained (all symbols from the same subsegment are spaced from each other by 12 symbol intervals), despite the incorporation of the sync symbols into the composite data stream.

Figure 20:
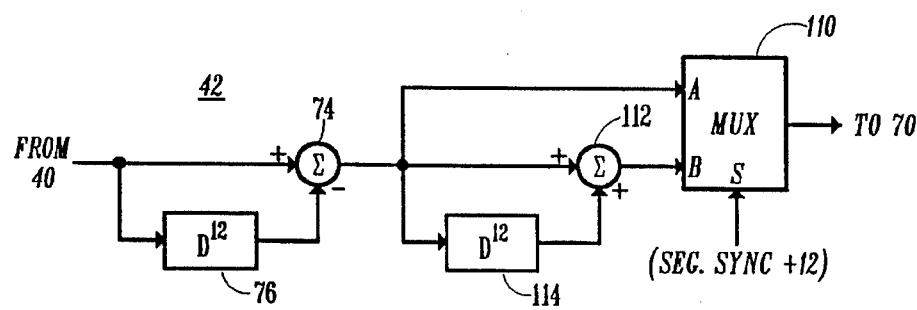
FIG. 20 is a block diagram of comb filter 42 of FIG. 8 modified for processing data segment and frame sync signals.

FIG. 20 shows an embodiment of comb filter 42 of FIG. 8 modified for operation in accordance with the sync insertion aspects of the invention. The modification comprises the provision of a multiplexer 110 having an A input for directly receiving the output of the comb filter and a B input for receiving the output of a summer 112. One input of summer 112 is connected directly to the output of the comb filter while its second input is connected to the comb filter output by a 12-symbol delay element 114. The B input of multiplexer 110 is selected during symbol intervals 13–16 (i.e. the sync interval delayed by 12 symbol clocks) and otherwise the A input is selected.

In operation, the output of comb filter 42 during the sync interval comprises:

$S_0$—A(n−1)
$S_1$—B(n−1)
$S_2$—C(n−1)
$S_3$—D(n−1)

This information, which is applied to the decoder via the A input of multiplexer 110, does not represent meaningful data and is therefore ignored by the decoder. However, beginning with the next symbol in the data segment occurring at time n (i.e. a symbol from subsegment E), symbols from the same subsegments are properly combed together and provided to the decoder via the A input of multiplexer 110. During the first 4 symbols of the data segment occurring at time (n+1) the B input of multiplexer 110 is selected. The output of comb filter 42 during this period is:

A(n+1)—$S_0$
B(n+1)—$S_1$
C(n+1)—$S_2$
D(n+1)—$S_3$

These values are combined in summer 112 with the 4 outputs of the comb filter during the sync interval stored in delay 114 to provide the 4 successive outputs A(n+1)–A(n−1), B(n+1)—B(n−1), C(n+1)–C(n−1) and D(n+1)–D(n−1). It will be noted that each output represents combed data symbols from the same subsegment as desired. Thereafter, the A input of multiplexer 110 is again selected and normal processing continues.

Figure 21:
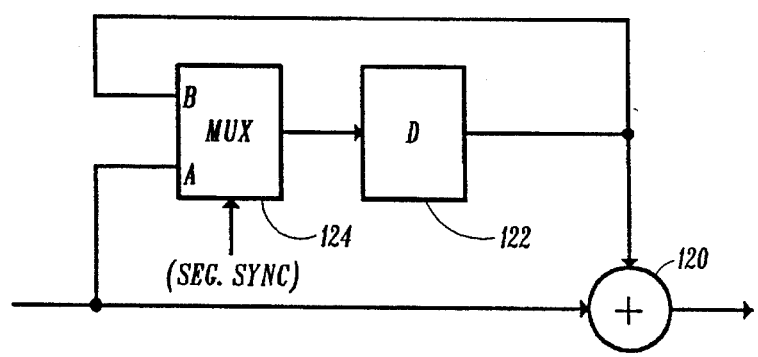
FIG. 21 is a block diagram of a postcoder 48A–48L of FIG. 8 modified for processing data segment and frame sync signals.

FIG. 21 shows an embodiment of the postcoders used in the receiver of the invention, see, for example, postcoders 48A–48L of FIG. 8 and 10, modified for operation in accordance with the sync insertion aspects of the invention. The modified postcoder, which comprises a modulo adder 120 and a feedforward delay 122, further includes a multiplexer 124 for coupling the output of delay 122 back to its input during the sync interval and otherwise applying the postcoder input signal to an input of adder 120 through delay 122. As a result, after the sync interval during which the output of the postcoder is ignored, each of the modified postcoder 48A–48L will have stored in its respective delay 122 the symbol from the subsegment with which it is associated as desired.

Figure 22:
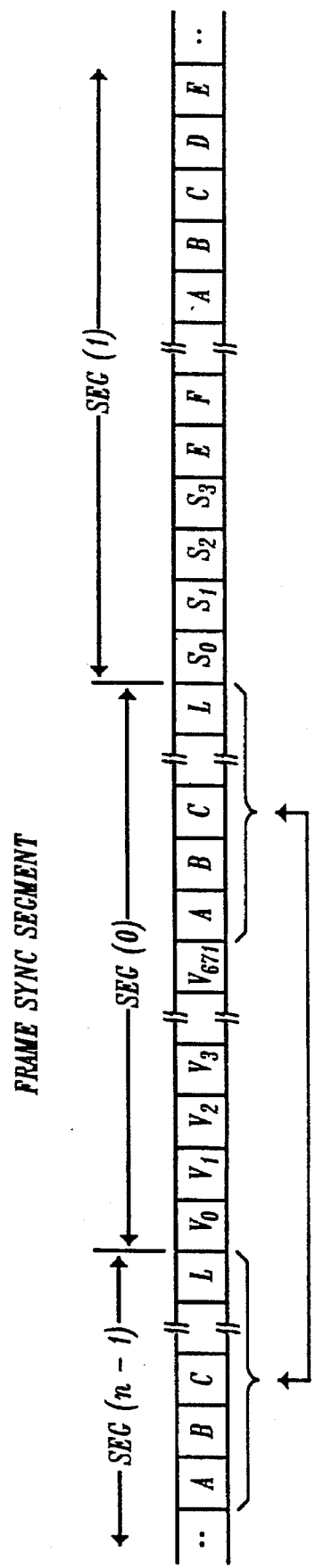
FIG. 22 illustrates the format of the signal developed at the output of multiplexer 62 of FIG. 4 in the vicinity of a frame sync signal.

Frame sync insertion and processing is effected much in the same manner as described above in connection with data segment sync. More specifically, during the frame sync interval, i.e. the first data segment of each frame, generator 66 and multiplexer 62 are initially operated for inserting frame sync symbols $V_0$–$V_{671}$ into the first 672 symbol positions of the frame sync segment $S_0$ as shown in FIG. 22. The last 12 symbols of the frame sync segment are inserted into the data stream by RAM 64 and comprise the last 12 symbols of the last data segment 312 of the previous frame (which had previously been written into RAM 64). Also, since the B inputs of multiplexers 46, 53 and 55 are selected during the frame sync interval, delay elements 48, 54 and 56 will assume the condition shown in FIG. 18 at the end of the segment sync interval of the next data segment $S_1$, which will then be formed as previously described and as shown in FIG. 22.

The circuits of FIGS. 20 and 21 operate as previously described to insure that symbols from each of the subsegments A–L are processed with symbols only of the same subsegment. The outputs of the two circuits during the frame sync segment $S_0$ do not represent meaningful data and are therefore ignored during subsequent processing.

Figure 23:
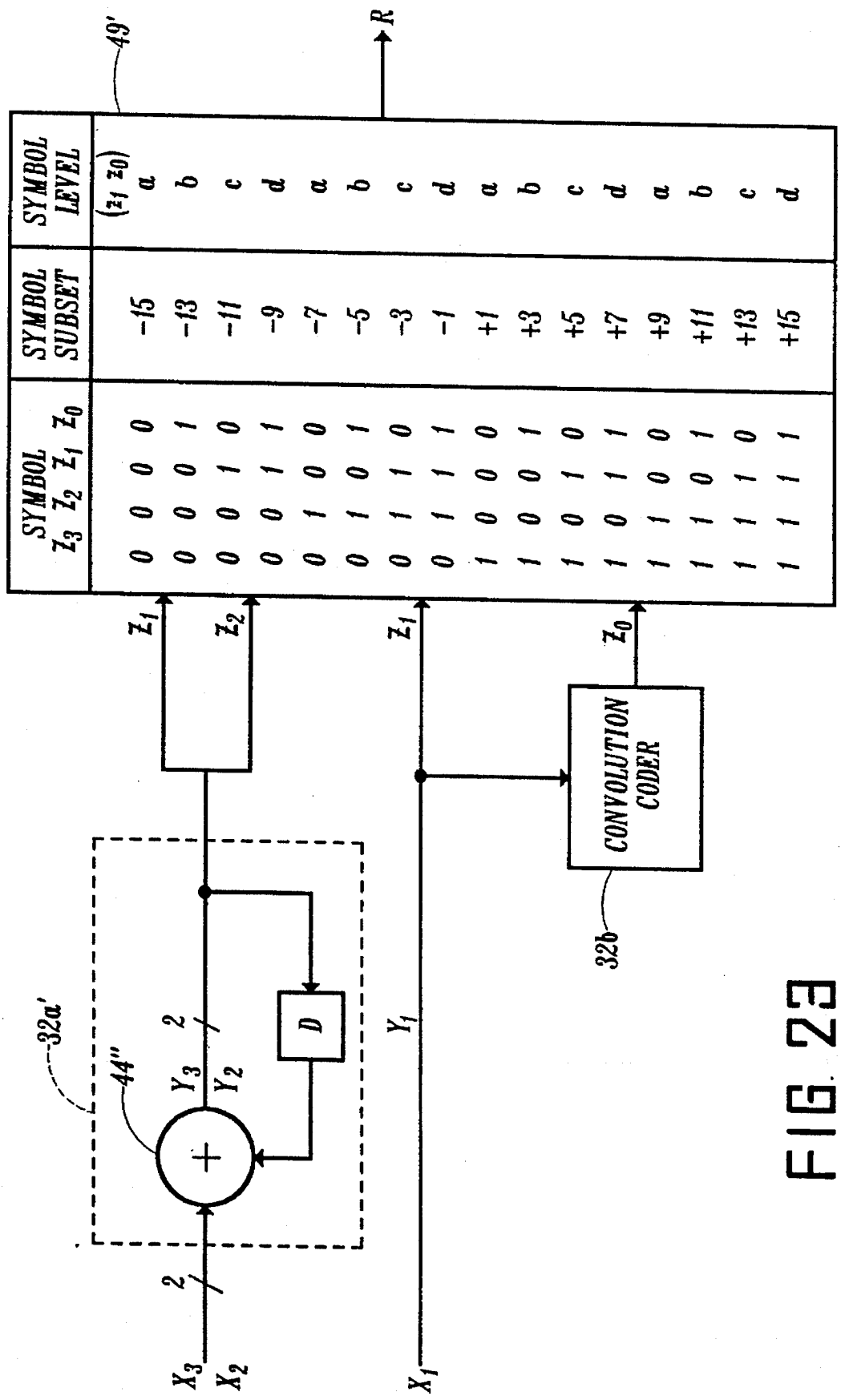
FIG. 23 illustrates an embodiment of the invention in which an increased bit rate transmission is achieved by providing input data in the form of 3 bits per symbol.

As mentioned previously, the system of the invention may be utilized with different mapping constellations to provide, for example, increased bit rates and with different modulation schemes such as QAM. FIG. 23 illustrates an application of the invention to a system wherein each symbol represents 3 bits instead of 2 bits as previously described. As illustrated in the drawing 3 input data bits $X_1$, $X_2$ and $X_3$ are provided at the symbol rate, bits $X_3$ and $X_2$ being converted by a modulo 4 precoder 32a′ which includes a modulo 4 combiner 44′, to bits $Y_3$ and $Y_2$ for application as bits $Z_3$ and $Z_2$ to a 16-level symbol mapper $49^1$. Data bit $X_1$ is applied as bit $Z_1$ to a third input of mapper $49^1$ and to convolution encoder 32b which develops bit $Z_0$ for application to the fourth input of mapper $49^1$. As in the previously described embodiment, bits $Z_1 Z_0$ identify subsets a, b, c, and d, each of which comprises 4 symbol levels. Also, within each subset the respective symbol amplitudes differ by a magnitude of 8 units and successive symbol levels (e.g. −15, −13) are selected by common states of bits $Z_3 Z_2 Z_1$. The signal generated by the circuit of FIG. 23 may therefore be decoded using the techniques previously described. In this example, an optimum MLSE decoder (i.e. one that does not take into account the precoder and is used to decode the output of the comb filter) would have 8 times the number of states that the encoder has. The inclusion of the modulo-4 precoder allows the decoder to operate on a trellis that has only twice as many states as the encoder and still decode the uncoded bits without error propagation.

FIGS. 24A and 24B illustrate the application of the invention to a QAM modulator. As shown in FIG. 24A, 3 inputs bits $X_1$, $X_2$ and $X_3$ are provided, bits $X_3$ and $X_2$ being independently precoded by respective modulo—2 precoders $32^{11}a$ and $32^{111}a$ to provide output bits $Z_3$ and $Z_2$ and bit $X_1$ being supplied to convolution encoder 32b for generating output bits $Z_1$ and $Z_0$. Output bits $Z_3 Z_2 Z_1 Z_0$ are applied to a symbol mapper $49^{11}$ for generating 16 quadrature related symbols (see FIG. 24B) belonging to one of the subsets a–d for application to a QAM modulator $36^1$. In connection with the foregoing, it will again be observed that bits $Z_1$ $Z_0$ identify the respective symbol subset a–d. Optimum decoding without the precoders would require a decoder having $2^3=8$ times the number of states that the encoder has. With the precoders, the decoder would only have twice the number of states.

Figure 25A:
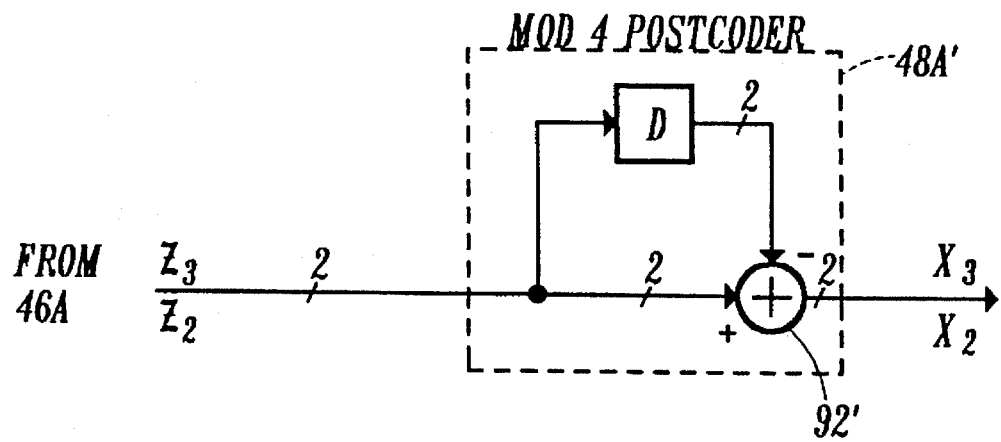
FIGS. 25A and 25B illustrate respective postcoder configurations useful in receivers for the embodiments of the invention shown in FIGS. 23 and 24.
Figure 25B:
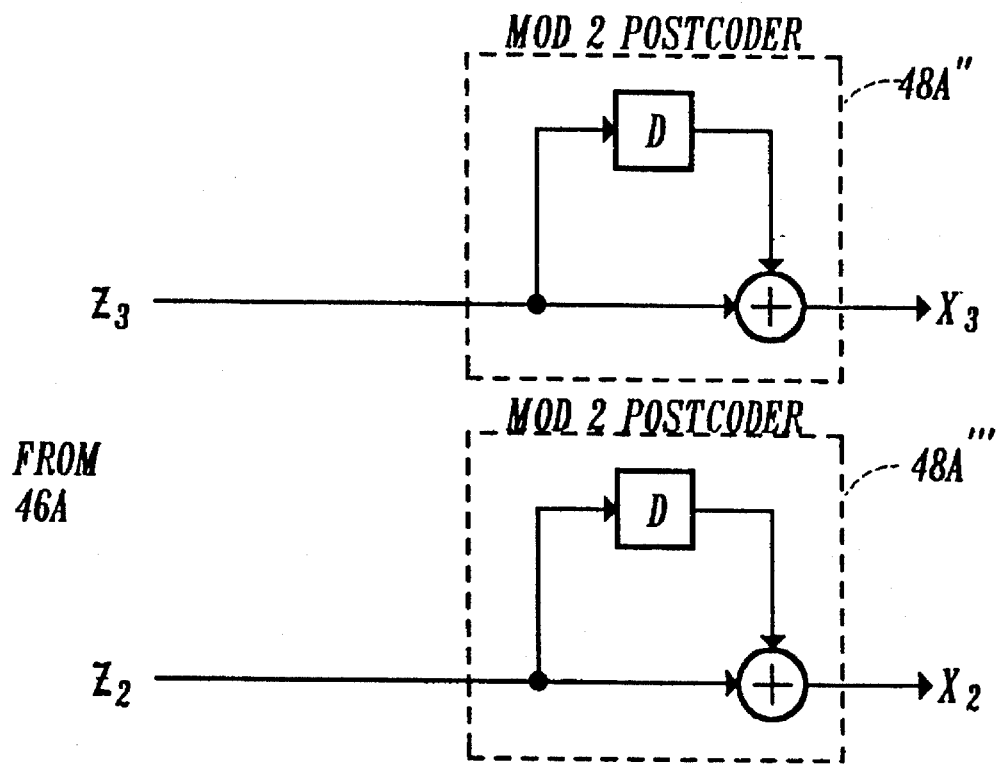

Receivers for the systems of FIGS. 23 and 24 may take the form generally illustrated in FIG. 8. In the case of the system of FIG. 23, a modulo 4 postcoder 48A', including a modulo 4 combiner 92' as shown in FIG. 25A would replace each modulo 2 postcoder 48A and, in the case of the system of FIGS. 24A and B, a pair of modulo 2 postcoders 48A" and 48A'" as shown in FIG. 25B would replace each modulo 2 postcoder 48A.

It is recognized that numerous changes in the described embodiments of the invention will be apparent to those skilled in the art without departing from its true spirit and scope. The invention is to be limited only as defined in the claims.

We claim:

1. A trellis coded modulator comprising:

means for convolutionally coding a first input data bit $X_1$, for deriving first and second output bits $Z_0$ and $Z_1$;

means for precoding one or more second input data bits $X_2$–$X_N$ for deriving respective output bits $Z_2$–$Z_N$; and means for mapping the output bits $Z_0$, $Z_1$, $Z_2$–$Z_N$ into corresponding one-dimensional multi-value symbols, wherein said symbols form a phase variant symbol constellation and wherein the output bits $Z_0$, $Z_1$ identify respective subsets of said symbols, each of said subsets comprising two or more equally spaced symbol values, and the output bits $Z_1$, $Z_2$–$Z_N$ identify respective pairs of said symbols, each of said pairs comprising two adjacent symbol values.

2. The trellis coded modulator of claim 1 wherein said means for precoding comprises means for precoding one second input data bit $X_2$ for deriving an output bit $Z_2$ and wherein said means for mapping comprises means for mapping output bits $Z_0$, $Z_1$, $Z_2$ into corresponding eight-value symbols, each of said subsets comprising two equally spaced symbol values and the output bits $Z_1$, $Z_2$ identifying said respective pairs of said symbols.

3. The trellis coded modulator of claim 1 wherein said multi-value symbols comprise symbols having a plurality of distinct amplitude levels.

4. The trellis coded modulator of claim 3 wherein said amplitude levels are symmetrical about a zero level and including means for offsetting the amplitude of each of said symbols by a predetermined amount for providing a pilot component.

5. The trellis coded modulator of claim 2 wherein said eight-value symbols comprise symbols having eight distinct amplitude levels.

6. The trellis coded modulator of claim 1 including means for supplying said input data bits $X_1$, $X_2$–$X_N$ at a predetermined symbol rate and wherein said precoder and convolution coder each include one or more M symbol interval delay elements, whereby said output bits $Z_0$, $Z_1$, $Z_2$–$Z_N$ are provided in the form of M interleaved groups of separately coded bits.

7. The trellis coded modulator of claim 6 wherein M is equal to 12.

8. The trellis coded modulator of claim 1 wherein the convolution coder comprises a 4-state, rate ½, feedback, systematic convolution coder.

9. The trellis coded modulator of claim 2 wherein said precoder comprises means for modulo-2 adding a current input data bit $X_2$ with the input data bit $X_2$ occurring M input data bit intervals prior thereto.

10. The trellis coded modulator of claim 9 wherein M is equal to 12.

11. A trellis coded modulator comprising:

means for supplying two or more input data bits $X_1$, $X_2$–$X_N$ at a predetermined symbol rate;

a first coder including at least one delay element M symbol intervals in length for convolutionally coding input bit $X_1$ for deriving first and second output bits $Z_0$ and $Z_1$;

a second coder including a delay element M symbol intervals in length for precoding input bits $X_2$–$X_N$ for deriving respective output bits $Z_2$–$Z_N$, the output bits $Z_0$, $Z_1$, $Z_2$–$Z_N$ thereby being provided in the form of M interleaved groups of separately coded bits; and means for mapping the output bits $Z_0$, $Z_1$, $Z_2$–$Z_N$ into corresponding one-dimensional multi-value symbols each having a different amplitude level, wherein said symbols form a phase variant symbol constellation, the output bits $Z_0$, $Z_1$ identifying respective subsets of said symbols, wherein the difference between the amplitude levels of the symbols of each of said subsets are equal, and the output bits $Z_1$, $Z_2$–$Z_N$ identifying respective pairs of said symbols each comprising two adjacent amplitude levels.

12. The trellis coded modulator of claim 11 wherein M is equal to 12.

13. The trellis coded modulator of claim 11 wherein said means for supplying comprises means for supplying two input data bits $X_1$, $X_2$, said second coder precoding input bit $X_2$ for deriving an output bit $Z_2$ and said means for mapping comprising means for mapping output bits $Z_0$, $Z_1$, $Z_2$ into corresponding 8-level symbols, the output bits $Z_1$, $Z_2$ identifying respective pairs of said symbols each comprising two adjacent amplitude levels.

14. A trellis coded modulator comprising:

means for convolutionally coding a first input data bit $X_1$, for deriving first and second output bits $Z_0$ and $Z_1$;

means for precoding one or more second input data bits $X_2$–$X_N$ for deriving respective output bits $Z_2$–$Z_N$;

means for developing an output signal by mapping the output bits $Z_0$, $Z_1$, $Z_2$–$Z_N$ into corresponding one-dimensional multi-value symbols, wherein said symbols form a phase variant symbol constellation and wherein the output bits $Z_0$, $Z_1$ identify respective subsets of said symbols, each of said subsets comprising two or more equally spaced symbol values, and the output bits $Z_1$, $Z_2$–$Z_N$ identify respective pairs of said symbols, each of said pairs comprising two adjacent symbol values;

means for inserting a synchronization signal in said output signal at selected time intervals; and means for preventing said means for precoding and said means for convolutionally coding from changing state during said selected time intervals.

15. The trellis coded modulator of claim 14 wherein said means for precoding comprises means for precoding one second input data bit $X_2$ for deriving an output bit $Z_2$ and wherein said means for mapping comprises means for mapping output bits $Z_0$, $Z_1$, $Z_2$ into corresponding eight-value symbols, each of said subsets comprising two equally spaced symbol values and the output bits $Z_1$, $Z_2$ identifying said respective pairs of said symbols.

16. The trellis coded modulator of claim 14 wherein said multi-value symbols comprise symbols having a plurality of distinct amplitude levels.

17. The trellis coded modulator of claim 16 wherein said amplitude levels are symmetrical about a zero level and including means for offsetting the amplitude of each of said symbols by a predetermined amount for providing a pilot component.

18. The trellis coded modulator of claim 15 wherein said eight-value symbols comprise symbols having eight distinct amplitude levels.

19. The trellis coded modulator of claim 14 including means for supplying said input data bits $X_1$, $X_2$–$X_N$ at a predetermined symbol rate and wherein said precoder and convolution coder each include one or more M symbol interval delay elements, whereby said output bits $Z_0$, $Z_1$, $Z_2$–$Z_N$ are provided in the form of M interleaved groups of separately coded bits.

20. The trellis coded modulator of claim 19 wherein M is equal to 12.

21. The trellis coded modulator of claim 14 wherein the convolution coder comprises a 4-state, rate ½, feedback, systematic convolution coder.

22. The trellis coded modulator of claim 15 wherein said precoder comprises means for modulo-2 adding a current input data bit $X_2$ with the input data bit $X_2$ occurring M input data bit intervals prior thereto.

23. The trellis coded modulator of claim 22 wherein M is equal to 12.

24. A trellis coded modulator comprising:

means for supplying two or more input data bits $X_1$, $X_2$14 $X_N$ at a predetermined symbol rate;

a first coder including at least one delay element M symbol intervals in length for convolutionally coding input bit $X_1$ for deriving first and second output bits $Z_0$ and $Z_1$;

a second coder including a delay element M symbol intervals in length for precoding input bits $X_2$–$X_N$ for deriving respective output bits $Z_2$–$Z_N$, the output bits $Z_0$, $Z_1$, $Z_2$–$Z_N$ thereby being provided in the form of M interleaved groups of separately coded bits; and means for developing an output signal by mapping the output bits $Z_0$, $Z_1$, $Z_2$–$Z_N$ into corresponding one-dimensional multi-value symbols each having a different amplitude level, wherein said symbols form a phase variant symbol constellation, the output bits $Z_0$, $Z_1$ identifying respective subsets of said symbols, wherein the difference between the amplitude levels of the symbols of each of said subsets are equal, and the output bits $Z_1$, $Z_2$–$Z_N$ identifying respective pairs of said symbols each comprising two adjacent amplitude levels;

means for inserting a synchronization signal in said output signal at selected time intervals; and means for preventing said means for precoding and said means for convolutionally coding from changing state during said selected time intervals.

25. The trellis coded modulator of claim 24 wherein M is equal to 12.

26. The trellis coded modulator of claim 24 wherein said means for supplying comprises means for supplying two input data bits $X_1$, $X_2$, said second coder precoding input bit $X_2$ for deriving an output bit $Z_2$ and said means for mapping comprising means for mapping output bits $Z_0$, $Z_1$, $Z_2$ into corresponding 8-level symbols, the output bits $Z_1$, $Z_2$ identifying respective pairs of said symbols each comprising two adjacent amplitude levels.

* * * * *

UNITED STATES PATENT AND TRADEMARK OFFICE
CERTIFICATE OF CORRECTION

PATENT NO. : 5,600,677                                     Page 1 of 2
DATED      : February 4, 1997
INVENTOR(S): Richard W. Citta et al.

It is certified that error appears in the above-indentified patent and that said Letters Patent is hereby corrected as shown below:

Column 15:

In claim 24, line 28, cancel "14" and substitute therefor -- - --.

Under References Cited, U.S. Patent documents, insert the following:

| | | | |
|---|---|---|---|
| 4,077,021 | 2/1978  | Csajka et al...... | 332/9R |
| 5,052,000 | 9/1991  | Wang et al........ | 371/43 |
| 5,233,629 | 8/1993  | Paik et al........ | 375/39 |
| 5,321,725 | 6/1994  | Paik et al........ | 375/39 |
| 5,164,963 | 11/1992 | Lawrence et al.... | 375/39 |
| 5,181,112 | 1/1993  | Citta et al....... | 358/141 |
| 5,086,340 | 2/1992  | Citta et al....... | 358/141 |
| 4,677,625 | 6/1987  | Betta et al....... | 371/43 |
| 5,105,442 | 4/1990  | Wei............... | 375/39 |
| 5,243,627 | 9/1993  | Betts et al....... | 375/39 |

Under References Cited, Other Publications, insert the following:

IEEE Communications Magazine, Feb., 1987, Vol. 25, No. 2, "Trellis Coded Modulation with Redundant Signal Sets" Part 1: Introduction, pgs. 5 - 11, Gottfried Ungerboeck.

UNITED STATES PATENT AND TRADEMARK OFFICE
CERTIFICATE OF CORRECTION

PATENT NO. : 5,600,677
DATED : February 4, 1997
INVENTOR(S) : Richard W. Citta et al.

It is certified that error appears in the above-indentified patent and that said Letters Patent is hereby corrected as shown below:

IEEE Communications Magazine, Feb., 1987, Vol. 25, No. 2, "Trellis Coded Modulation with Redundant Signal Sets" Part II: State of the Art, pgs. 12 - 21, Gottfried Ungerboeck.

Signed and Sealed this

Fifteenth Day of April, 1997

*Attest:*

BRUCE LEHMAN

*Attesting Officer*     *Commissioner of Patents and Trademarks*